(12) United States Patent
Sada et al.

(10) Patent No.: US 7,950,856 B2
(45) Date of Patent: May 31, 2011

(54) TAPERED ROLLER BEARING

(75) Inventors: Takashi Sada, Kashiwara (JP); Hiroki Matsuyama, Nara (JP); Tomoya Hattori, Kashiba (JP)

(73) Assignee: JTEKT Corporation, Osaka (JP)

( * ) Notice: Subject to any disclaimer, the term of this patent is extended or adjusted under 35 U.S.C. 154(b) by 579 days.

(21) Appl. No.: 12/073,326

(22) Filed: Mar. 4, 2008

(65) Prior Publication Data

US 2008/0219606 A1 Sep. 11, 2008

(30) Foreign Application Priority Data

| Mar. 5, 2007 | (JP) | ............... | 2007-053595 |
| Mar. 13, 2007 | (JP) | ............... | 2007-063454 |
| Mar. 13, 2007 | (JP) | ............... | 2007-063457 |
| Mar. 20, 2007 | (JP) | ............... | 2007-072349 |

(51) Int. Cl.
*F16C 33/66* (2006.01)
*F16C 33/58* (2006.01)

(52) U.S. Cl. ...................... 384/473; 384/564

(58) Field of Classification Search .............. 384/462, 384/473, 571, 488, 564
See application file for complete search history.

(56) References Cited

U.S. PATENT DOCUMENTS

| 1,840,607 A | 1/1932 | Scribner |
| 3,856,368 A | 12/1974 | Andersen |
| 3,858,950 A * | 1/1975 | Otto ............................. 384/485 |
| 4,919,551 A | 4/1990 | Nunotani et al. |
| 5,044,782 A * | 9/1991 | Jankowski ..................... 384/482 |
| 5,492,416 A * | 2/1996 | Gabelli et al. ................. 384/462 |
| 2006/0245678 A1 * | 11/2006 | Chiba et al. .................... 384/571 |
| 2007/0133914 A1 * | 6/2007 | Matsuyama et al. .......... 384/470 |
| 2008/0096715 A1 | 4/2008 | Kenichi |

FOREIGN PATENT DOCUMENTS

| DE | 102004014279 | 10/2004 |
| EP | 1906036 | 4/2008 |
| GB | 2166811 | 5/1986 |
| JP | 58-018128 | 2/1983 |
| JP | 62-209223 | 9/1987 |
| JP | 1-193411 | 8/1989 |
| JP | 6-63932 | 9/1994 |
| JP | 8-135664 | 5/1996 |
| JP | 8-135666 | 5/1996 |
| JP | 2000-170775 | 6/2000 |
| JP | 2004-76766 | 3/2004 |
| JP | 2004-293700 | 10/2004 |
| JP | 2006-308008 | 11/2006 |

OTHER PUBLICATIONS

European Search Report dated Mar. 3, 2010.

* cited by examiner

*Primary Examiner* — Thomas R Hannon
(74) *Attorney, Agent, or Firm* — McGinn IP Law, PLLC

(57) ABSTRACT

A tapered roller bearing includes: an oil guide member that opens and closes an annular opening between an outer peripheral surface of a large rib of an inner ring and an outer ring and is mounted on the large rib; and a discharge port that discharges, along the outer peripheral surface of the large rib, lubricating oil and is formed through an inner peripheral portion of the oil guide member. The oil guide member includes a closing portion for closing the annular opening. When a fluid pressure of the lubricating oil which flows through pockets of a cage toward an inner peripheral surface of the outer ring is below a predetermined values, the closing portion closes the annular opening and guides the lubricating oil toward the discharge port. When the fluid pressure exceeds the predetermined value, the closing portion opens the annular opening.

8 Claims, 18 Drawing Sheets

TAPERED ROLLER BEARING

BACKGROUND OF THE INVENTION

This invention relates to a tapered roller bearing and more particularly to a tapered roller bearing device which supports a pinion shaft, for example, of a final reduction gear (differential gear) of an automobile, and is lubricated by lubricating oil received within the bearing device.

In a conventional tapered roller bearing as shown in FIG. 23, a plurality of tapered rollers 230 are rollably disposed between a raceway surface 211 of an inner ring 210 and a raceway surface 221 of an outer ring 220 in such a manner that a large end surface 232 of each tapered roller 230 is slidingly guided by a roller guide surface 213 of a rib 212 of the inner ring 210 while a small end surface 233 of each tapered roller 230 is slidingly guided by a roller guide surface 216 of a small rib 215 of the inner ring 210. A cage 240 having pockets 243 respectively holding the tapered rollers 230 is disposed between the two raceway surfaces 211 and 221.

There is also known a conventional tapered roller bearing (disclosed, for example, in JP-A-01-193411) so constructed as to prevent foreign matters from intruding into the interior of the bearing.

In this conventional tapered roller bearing, a first seal having a lip held in sliding contact with an inner peripheral surface of an outer ring is fixed to a small end portion of an inner ring. Further, a second seal having a lip held in sliding contact with an end surface of the outer ring is fixed to a large end portion of the inner ring. Lubricating oil flowed into the tapered roller bearing through the lip of the first seal forces the lip of the second seal open, and is discharged from the tapered roller bearing.

In the tapered roller bearing as shown in FIG. 23, a flow of a fluid from the small end side of the inner ring 210 toward the large end side thereof (that is, a pumping action due to a centrifugal force) develops during the rotation of the bearing.

Utilizing this pumping action, lubricating oil is supplied into the bearing from the small rib (215) side of the inner ring 210, and is discharged from the rib (212) side of the inner ring 210.

However, during the high-speed rotation of the bearing, the centrifugal force becomes high, so that the lubricating oil supplied to the small rib (215) side of the inner ring 210 tends to flow as indicated by arrow P', and is liable to escape toward the outer ring 220. It is thought from this that the amount of supply of the lubricating oil to an area of contact between the large end surface 232 of each tapered roller 230 and the roller guide surface 213 of the rib 212 of the inner ring 210 becomes insufficient.

Particularly when the amount of supply of the lubricating oil is reduced in order to achieve a low-torque design of the tapered roller bearing so as to reduce a torque loss of a machinery, the amount of the lubricating oil supplied to the area of contact between the large end surface 232 of each tapered roller 230 and the roller guide surface 213 of the rib 212 of the inner ring 210 is liable to become insufficient, and this leads to a fear that seizure may occur.

Furthermore, in the tapered roller bearing disclosed in JP-A-01-193411, the lubricating oil resides within the bearing when the lip of the second seal is held in a closed condition, and an oil agitation loss is increased by this residing lubricating oil, so that a torque loss develops, and therefore the low-torque design can not be achieved.

Incidentally, the tapered roller bearing (see JP-A-2004-76766) which includes a plurality of tapered rollers disposed between an outer ring and an inner ring, and a cage holding these tapered rollers is compact, and can support large radial and axial loads, and besides can be used in a high-speed rotating operation. Therefore, such tapered roller bearings have been extensively used in a pinion shaft support apparatus for a vehicle, etc., as shown in JP-A-2000-170775.

FIG. 22 shows one example of a differential gear of the type in which a tapered roller bearing device of the present invention can be used. The differential gear includes a pinion shaft 442 rotatably supported on a housing 441 and having a pinion gear 443 provided at a rear end thereof, a ring gear 444 meshing with the pinion gear 443, a pair of inner and outer tapered roller bearings 445 and 446 rotatably supporting the pinion shaft 442 on the housing 441, and a drive shaft-connecting flange coupling 447 formed at an outer end of the pinion shaft 442.

In this differential gear, lubricating oil splashed up in accordance with the rotation of the ring gear 444 flows through a lubricating oil passageway 448 within the housing 441, and is introduced into a region between the pair of tapered roller bearing devices 445 and 446. When the tapered roller bearings 445 and 446 rotate, a flow of the fluid (a pumping action) from a small rib side of an inner ring of each bearing toward a rib side thereof occurs. Therefore, in the tapered roller bearings 445 and 446 used in the differential gear, the lubricating oil is supplied from the small rib side of the inner ring and is discharged from the rib side of the inner ring, utilizing this pumping action. This lubricating method is commonly used.

With the above conventional lubricating method, the lubricating oil can be easily introduced into each tapered roller bearing. However, during high-speed rotation, most of the lubricating oil flows toward an outer ring under the influence of a centrifugal force, and therefore the lubricating oil is not sufficiently distributed to the vicinity of the rib of the inner ring, and much heat is generated at an area of sliding contact between the rib of the inner ring and a large end surface of each tapered roller, and besides the generated heat can not be easily removed (that is, a temperature rise is liable to occur at localized areas), so that seizure is liable to develop.

On the other hand, in a pinion shaft support apparatus of a vehicle, etc., to reduce a running torque of a tapered roller bearing in order to achieve a low-loss design has been a global problem. For reducing the running torque, it is effective to reduce the amount of lubricating oil passing through the bearing to thereby suppress an oil agitation loss caused by the lubricating oil. However, when the amount of the lubricating oil is reduced, the risk of seizure of the rib increases, and therefore at present, a large amount of lubricating oil is supplied to the tapered roller bearing.

SUMMARY OF THE INVENTION

With the above problems in view, it is an object of this invention to provide a tapered roller bearing in which lubricating oil can be efficiently supplied to an area of contact between a large end surface of each tapered roller and a roller guide surface of a rib of an inner ring, and a low-torque design and an anti-seizure property can be enhanced.

Another object of this invention is to provide a tapered roller bearing device in which even when the amount of lubricating oil within a tapered roller bearing is much reduced, seizure of a rib of an inner ring is less liable to occur, thereby achieving both of a low-torque design and seizure resistance.

In order to solve the above problems, the present invention provides the following arrangements.

(1) A tapered roller bearing comprising:

an inner ring that includes a large rib defining a roller guide surface, a small rib and a raceway surface formed between the large and small ribs;

an outer ring including a raceway surface;

tapered rollers that are rollably disposed between the raceway surfaces of the inner and outer rings, large end surfaces of the tapered rollers being slidingly guided by the roller guide surface;

a cage that includes pockets for holding the tapered rollers, respectively, and are disposed between the raceway surfaces of the inner and outer rings;

an oil guide member that opens and closes an annular opening between an outer peripheral surface of the large rib and the outer ring and is mounted on the outer peripheral surface of the large rib; and a discharge port that discharges, along the outer peripheral surface of the large rib, lubricating oil flowing from the small rib toward the large rib and is formed through an inner peripheral portion of the oil guide member, wherein the oil guide member includes a closing portion for closing the annular opening, wherein when a fluid pressure of the lubricating oil which flows through the pockets toward an inner peripheral surface of the outer ring is below a predetermined values, the closing portion closes the annular opening and guides the lubricating oil toward the discharge port, and wherein when the fluid pressure exceeds the predetermined value, the closing portion is operated by the fluid pressure to open the annular opening.

(2) The tapered roller bearing according to (1), wherein at least the closing portion is made of an elastic material so that when the fluid pressure of the lubricating oil exceeds the predetermined value, the closing portion is elastically deformed by the fluid pressure to open the annular opening.

(3) A tapered roller bearing comprising:

an inner ring that includes a large rib defining a roller guide surface, a small rib and a raceway surface formed between the large and small ribs;

an outer ring including a raceway surface;

tapered rollers that are rollably disposed between the raceway surfaces of the inner and outer rings, large end surfaces of the tapered rollers being slidingly guided by the roller guide surface;

a cage that includes pockets for holding the tapered rollers, respectively, and are disposed between the raceway surfaces of the inner and outer rings; and an oil guide member that is mounted on an outer peripheral surface of an end portion of the outer ring, and guides, toward an outer peripheral surface of the large rib, lubricating oil flowing from the small rib toward an inner peripheral surface of the outer ring through the pockets, wherein the oil guide member includes a tubular portion mounted on the outer peripheral surface of the end portion of the outer ring, and an annular portion that projects from an end of the tubular portion toward the outer peripheral surface of the large rib and is made of an elastic material so as to be elastically deformed, and wherein an inner peripheral edge of the annular portion is spaced a predetermined distance from the outer peripheral surface of the rib of the inner ring to form a discharge port for discharging the lubricating oil therebetween.

(4) The tapered roller bearing according to (3), wherein the inner peripheral edge of the annular portion projects beyond a point of intersection of an extension of an outer peripheral surface of a large annular end portion of the cage and an inner side surface of the annular portion toward a center of the bearing.

(5) The tapered roller bearing according to (3), wherein a fitting portion is formed at the outer peripheral surface of the end portion of the outer ring by reducing a diameter thereof by an amount corresponding to a thickness of the tubular portion, and when the tubular portion is fitted on the fitting portion so that the tubular portion is abutted against a step surface at an inner end of the fitting portion, the outer peripheral surface of the outer ring and an outer peripheral surface of the tubular portion cooperate with each other to form a generally continuous cylindrical surface.

(6) A tapered roller bearing comprising:

an inner ring that includes a large rib defining a roller guide surface, a small rib and a raceway surface formed between the large and small ribs;

an outer ring including a raceway surface;

tapered rollers that are rollably disposed between the raceway surfaces of the inner and outer rings, large end surfaces of the tapered rollers being slidingly guided by the roller guide surface;

a cage that includes pockets for holding the tapered rollers, respectively, and are disposed between the raceway surfaces of the inner and outer rings; and an annular oil guide member that is mounted through an elastic member on an end surface of the outer ring, and guides, toward an outer peripheral surface of the large rib, lubricating oil flowing from the small rib toward an inner peripheral surface of the outer ring through the pockets, wherein when an amount of flow of the lubricating oil is small, the annular oil guide member is held in contact with the end surface of the outer ring and is held in a closed condition by an urging force of the elastic member, wherein when the amount of flow of the lubricating oil is large, the annular oil guide member is displaced away from the end surface of the outer ring into an open condition by a fluid pressure of the lubricating oil against the urging force of the elastic member, and wherein an inner peripheral surface of the annular oil guide member is spaced a predetermined distance from the outer peripheral surface of the large rib of the inner ring to form a discharge port for discharging the lubricating oil therebetween.

(7) A tapered roller bearing device comprising:

a rotation shaft;

an inner ring that includes a rib and a raceway surface and is mounted on the rotation shaft;

an outer ring including a raceway surface;

tapered rollers that are rollably disposed between the raceway surfaces of the inner and outer rings, the tapered roller being slidingly guided by the rib;

a cage that includes pockets for holding the tapered rollers, respectively, and are disposed between the raceway surfaces of the inner and outer rings; and a heat radiation member that is held in contact with an end portion of the inner ring where the rib is located and the rotation shaft, and is made of a material higher in thermal conductivity than the rotation shaft.

(8) The tapered roller bearing device according to (7), wherein the heat radiation member is made of one of aluminum alloy and magnesium alloy.

In the above arrangement of (1), when the amount of the lubricating oil supplied to the small rib side of the inner ring during the rotation of the bearing is large, so that the fluid pressure of the lubricating oil flowing through the pockets toward the inner peripheral surface of the outer ring exceeds the predetermined value, the lubricating oil flowing through the pockets toward the inner peripheral surface of the outer ring is discharged while opening the closing portion of the oil guide member. Also, part of the lubricating oil supplied to the small rib side of the inner ring flows along an inner peripheral surface of the cage, and then is discharged through the discharge ports of the oil guide member. Thus, when the amount of the lubricating oil supplied to the small rib side of the inner ring is large, so that the amount of the lubricating oil passing through the interior of the tapered roller bearing is large, the lubricating oil is discharged while opening the closing portion, and the lubricating oil is discharged also through the discharge ports. Therefore, the residing of the lubricating oil within the tapered roller bearing can be suppressed, and a torque loss due to an oil agitation loss caused by the residing lubricating oil can be reduced.

When the amount of the lubricating oil supplied to the small rib side of the inner ring is small during the rotation of the bearing, so that the fluid pressure of the lubricating oil flowing through the pockets toward the inner peripheral surface of the outer ring is below the predetermined value, the annular opening between the outer peripheral surface of the rib of the inner ring and the outer ring is closed by the closing portion of the oil guide member.

Therefore, during the time of high-speed rotation when the amount of the lubricating oil supplied to the small rib side of the inner ring is small, and also the centrifugal force is large, the lubricating oil flowing through the pockets of the cage toward the inner peripheral surface of the outer ring is guided to an inner surface of the closing portion, and flows toward the outer peripheral surface of the rib of the inner ring, and then is discharged through the discharge ports of the oil guide member. At this time, the rib of the inner ring is cooled by the lubricating oil flowing toward the outer peripheral surface of the rib, and also part of the lubricating oil flows to be supplied to an area of contact between the large end surface of each tapered roller and the roller guide surface of the rib of the inner ring.

By thus guiding the flow of the lubricating oil, the lubricating oil can be efficiently supplied to the area of contact between the large end surface of each tapered roller and the roller guide surface of the rib of the inner ring. As a result, the amount of supply of the lubricating oil can be reduced, so that a low-torque design of the tapered roller bearing can be achieved. And besides, seizure due to an insufficient supply of lubricating oil can be prevented.

With this arrangement of (2), the closing portion of the oil guide member can be easily formed using the elastic material having a predetermined elastic force, and the oil guide member quite simple in structure can be provided at a low cost.

In the above arrangement of (3), during the rotation of the bearing, that portion of the lubricating oil (supplied to the small rib side of the inner ring) which flows through the pockets toward the inner peripheral surface of the outer ring is guided by the tubular portion and the annular portion of the oil guide member, and flows toward the outer peripheral surface of the rib of the inner ring, and then is discharged through the discharge port (the predetermined clearance) between the inner peripheral edge of the annular portion and the outer peripheral surface of the rib of the inner ring. At this time, the rib of the inner ring is cooled by the lubricating oil flowing toward the outer peripheral surface of the rib, and also part of the lubricating oil flows to be supplied to an area of contact between the large end surface of each tapered roller and the roller guide surface of the rib of the inner ring.

Therefore, even during the time of high-speed rotation when the amount of the lubricating oil supplied to the small rib side of the inner ring is small, and also the centrifugal force is large, the lubricating oil can be efficiently supplied to the area of contact between the large end surface of each tapered roller and the roller guide surface of the rib of the inner ring. As a result, the amount of supply of the lubricating oil can be reduced, so that a low-torque design of the tapered roller bearing can be achieved. And besides, seizure due to an insufficient supply of lubricating oil can be prevented.

When the amount of the lubricating oil supplied to the small rib side of the inner ring is large, the lubricating oil flowing toward the inner peripheral surface of the outer ring elastically deforms the annular portion of the oil guide member in a direction to expand the discharge port, and is smoothly discharged through the discharge port. Therefore, the residing of the lubricating oil within the bearing can be suppressed, and a torque loss due to an oil agitation loss caused by the residing lubricating oil can be reduced.

In the above arrangement (4), that portion of the lubricating oil (supplied to the small rib side of the inner ring) which flows through the pockets toward the inner peripheral surface of the outer ring passes through a space between the inner peripheral surface of the outer ring and an outer peripheral surface of the cage. The lubricating oil passing through this space will not flow linearly toward the discharge port, and hence will not be discharged directly through this discharge port, and instead this lubricating oil impinges on the inner side surface of the annular portion of the oil guide member, and is guided toward the outer peripheral surface of the rib of the inner ring.

Therefore, the lubricating oil can be more efficiently supplied to the area of contact between the large end surface of each tapered roller and the roller guide surface of the rib of the inner ring.

In the above arrangement (5), the tubular portion of the oil guide member is fitted on the fitting portion of the outer ring until an end of the tubular portion is brought into abutting engagement with the step surface at the inner end of the fitting portion, and by doing so, the tubular portion of the oil guide member can be accurately mounted on the fitting portion of the outer ring without being deviated from its proper position in the axial direction.

Furthermore, when the tubular portion of the oil guide member is mounted on the fitting portion of the outer ring, the outer peripheral surface of the outer ring and the outer peripheral surface of the tubular portion cooperate with each other to form the generally continuous cylindrical surface. Therefore, when mounting the tapered roller bearing on a housing by fitting the outer ring in a mounting hole in the housing, the tubular portion of the oil guide member will not prevent this mounting operation. As a result, the mounting hole in the housing does not need to be stepped at its inner surface, and the outer ring can be easily fitted into the mounting hole in the housing, thereby mounting the tapered roller bearing.

In the above arrangement (6), during the rotation of the bearing, the lubricating oil supplied into the bearing from the small rib side of the inner ring flows toward the rib by a pumping action caused by a centrifugal force.

In this case, when the amount of the lubricating oil passing through the bearing is small, the annular oil guide member is held in contact with the end surface of the outer ring and hence is held in the closed condition by the urging force of the elastic member. Therefore, that portion of the lubricating oil (supplied from the small rib side of the inner ring) which flows through the pockets of the cage toward the inner peripheral surface of the outer ring is guided along the inner surface of the closed annular oil guide member, and flows toward the outer peripheral surface of the rib of the inner ring, and then is discharged through the discharge port between the inner peripheral surface of the annular oil guide member and the outer peripheral surface of the rib of the inner ring. At this time, the rib of the inner ring is cooled by the lubricating oil flowing toward the rib, and also part of the lubricating oil flows to be supplied to an area of contact between the large end surface of each tapered roller and the roller guide surface of the rib of the inner ring.

Therefore, even during the time of high-speed rotation when the amount of the lubricating oil supplied from the small rib side of the inner ring is small, and also the centrifugal force is large, the lubricating oil can be efficiently supplied to the area of contact between the large end surface of each tapered roller and the roller guide surface of the rib of the inner ring. As a result, the amount of supply of the lubricating oil can be reduced, so that a low-torque design of the tapered roller bearing can be achieved. And besides, seizure due to an insufficient supply of lubricating oil can be prevented.

When the amount of the lubricating oil passing through the bearing is large, the annular oil guide member is displaced away from the end surface of the outer ring into the open condition by the fluid pressure of the lubricating oil against the urging force of the elastic member. As a result, the lubricating oil is smoothly discharged through a clearance between the annular oil guide member and the end surface of the outer ring. Therefore, the residing of the lubricating oil within the bearing is suppressed, and a torque loss due to an oil agitation loss caused by the residing lubricating oil can be reduced.

With the arrangement of (7), because of frictional heat generated at an area of contact between a roller guide surface of a rib of the inner ring and end surfaces of the rollers, the temperature of the rib becomes higher than the temperature of the rotation shaft, and the heat of the inner ring is released to the rotation shaft through the heat radiation member, thereby suppressing seizure. The heat radiation member is formed into a cylindrical shape, and is held in contact with the rotation shaft at its inner peripheral surface, and also is held in contact with at least part of a rib-side surface (back surface) of the inner ring of the tapered roller bearing.

Although the heat radiation member is basically formed into the cylindrical shape, it may be formed into any other suitable shape. The rotation shaft and/or the inner ring may be partially changed in shape according to the shape of the heat radiation member. Preferably, the area of contact of the heat radiation member with the rotation shaft is larger than the area of contact of the heat radiation member with the inner ring. For example, one preferred form of heat radiation member includes a cylindrical portion, a flange portion formed on and extending radially inwardly from an inner peripheral surface of the cylindrical portion at one end portion thereof, and an annular projecting portion formed at the one end of the cylindrical portion at an outer peripheral portion thereof. Another preferred form of heat radiation member includes a cylindrical portion, a flange portion formed on and extending radially inwardly from an inner peripheral surface of the cylindrical portion at one end portion thereof, and an annular projecting portion projecting axially from the inwardly-extending flange portion. In the latter case, an annular notch portion for receiving the annular projecting portion of the heat radiation member is formed in the inner ring.

The rotation shaft is usually made of steel such as carbon steel, and the inner ring is usually made of steel such as bearing steel. Thermal conductivity of carbon steel is 42 W/m·k (watt/meter×Kelvin), and when the rotation shaft is made of carbon steel, the heat radiation member is made of a material having thermal conductivity of more than 42 W/m·k. For example, thermal conductivity of brass is 60 W/m·k, thermal conductivity of copper is 170 W/m·k, thermal conductivity of pure magnesium is 156 W/m·k (Specific heat capacity is 1020 J/kg·K), thermal conductivity of pure aluminum is 237 W/m·k (Specific heat capacity is 900 J/kg·K), thermal conductivity of magnesium alloy AZ91 is 72 W/m·k, thermal conductivity of magnesium alloy AM60 is 62 W/m·k, thermal conductivity of aluminum alloy (die cast) 380 is 100 W/m·k, thermal conductivity of aluminum alloy (die cast) ADC12 is 92 W/m·k, and thermal conductivity of aluminum alloy (die cast) 6063 is 220 W/m·k. Therefore, all of these materials can be used as the material for forming the heat radiation member. Among these, the magnesium alloys are excellent in that they have a high resistance to deformation and good vibration/impact absorbing properties and undergo a less dimensional change, and therefore the magnesium alloys are suitable as the material for the heat radiation member. The aluminum alloys are suitable as the material for the heat radiation member in that they have a high thermal conductivity.

In the tapered roller bearing device of the present invention, frictional heat, generated at the rib of the inner ring which is liable to undergo seizure, can be easily released to the rotation shaft through the heat radiation member held in contact with the rib, so that seizure of the rib is suppressed. Therefore, the amount of lubricating oil can be reduced, and a friction loss of the bearing can be reduced. Therefore, both of the low-torque design and the seizure resistance can be achieved.

DETAILED DESCRIPTION OF PREFERRED EMBODIMENTS

Preferred embodiments of the present invention will be described below.

First Embodiment

A first embodiment of the present invention will now be described with reference to FIGS. 1 to 5.

Figure 1:
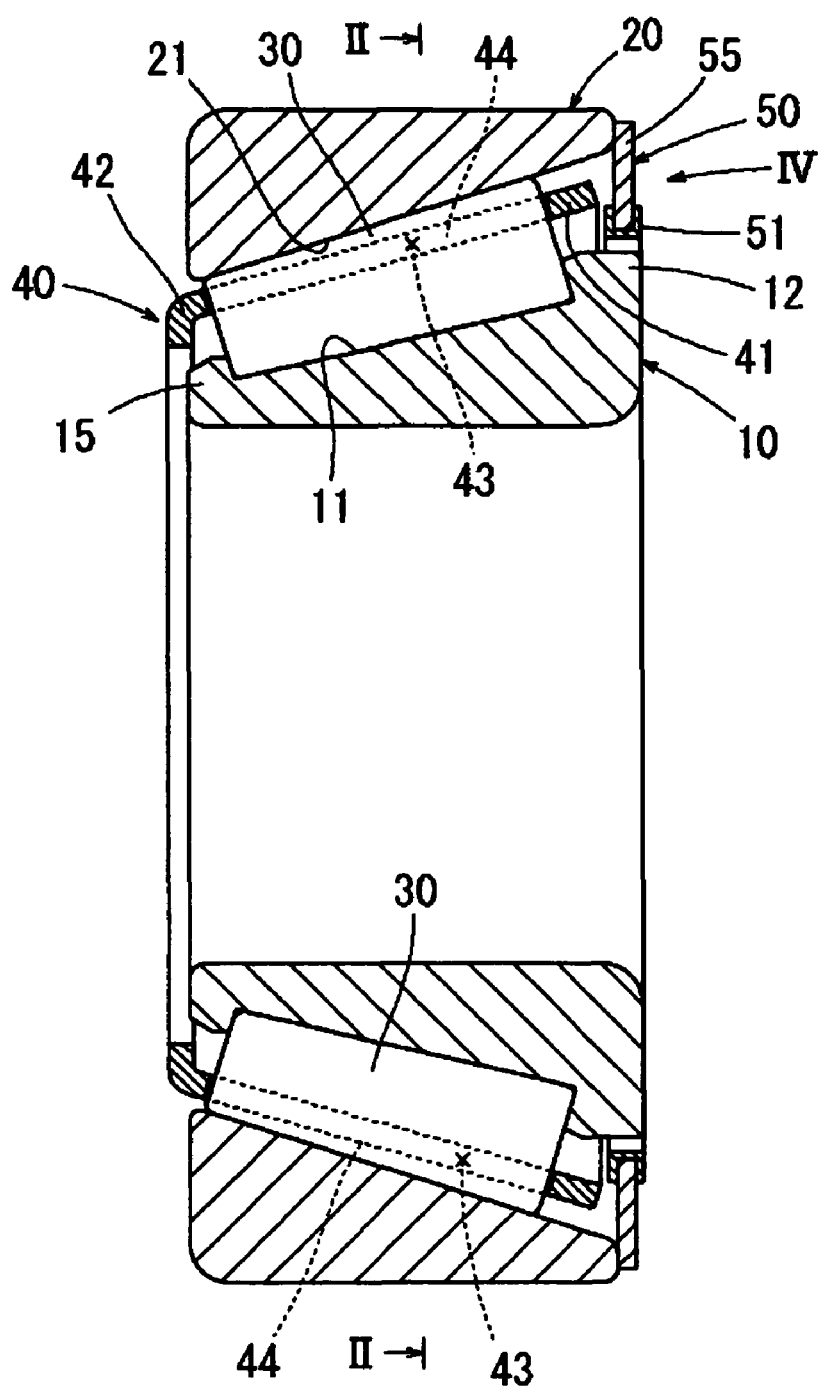
FIG. 1 is a longitudinal cross-sectional view showing a tapered roller bearing according to a first embodiment of the present invention.
Figure 2:
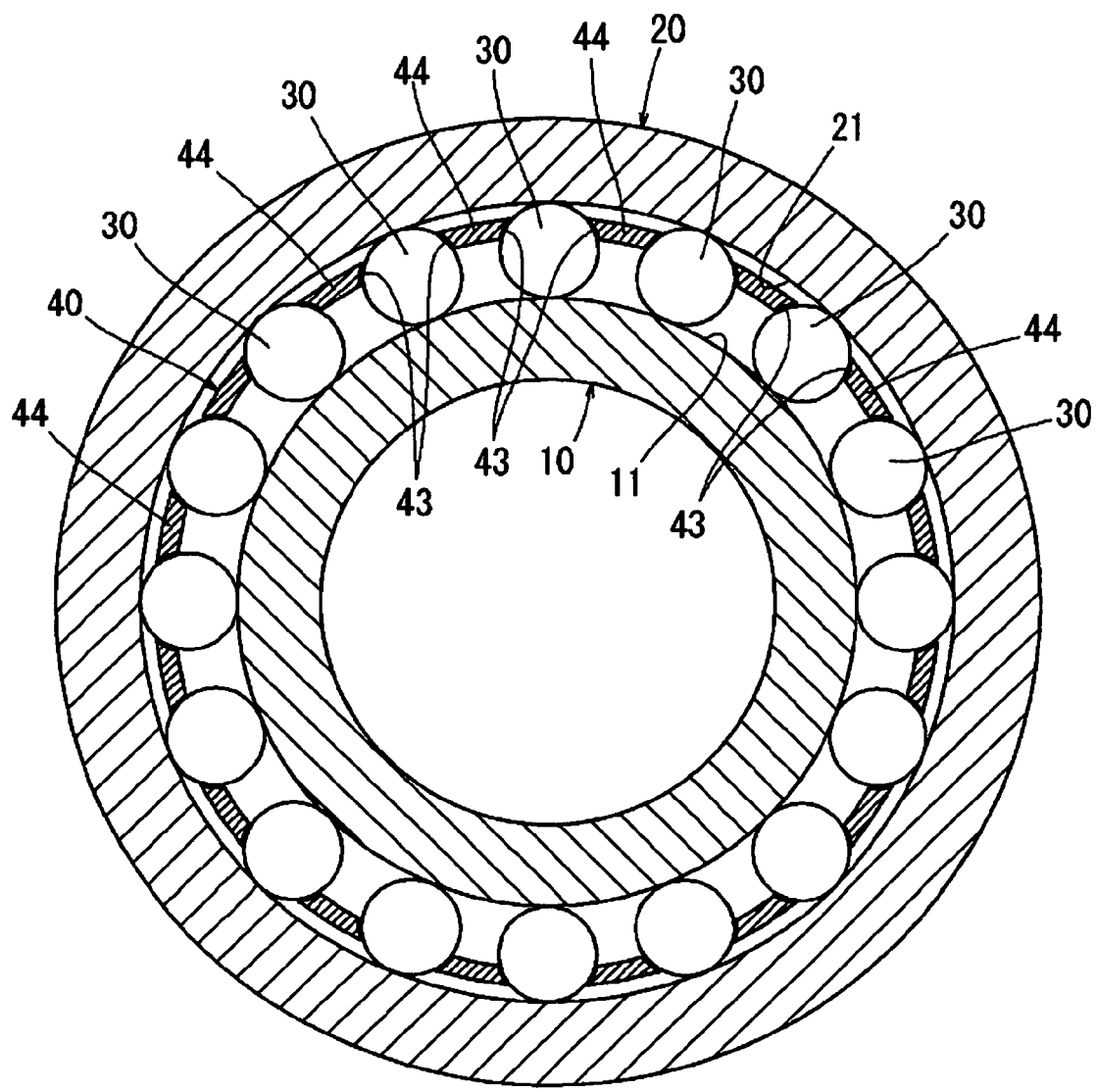
FIG. 2 is a transverse cross-sectional view taken along the line II-II of FIG. 1.
Figure 3:
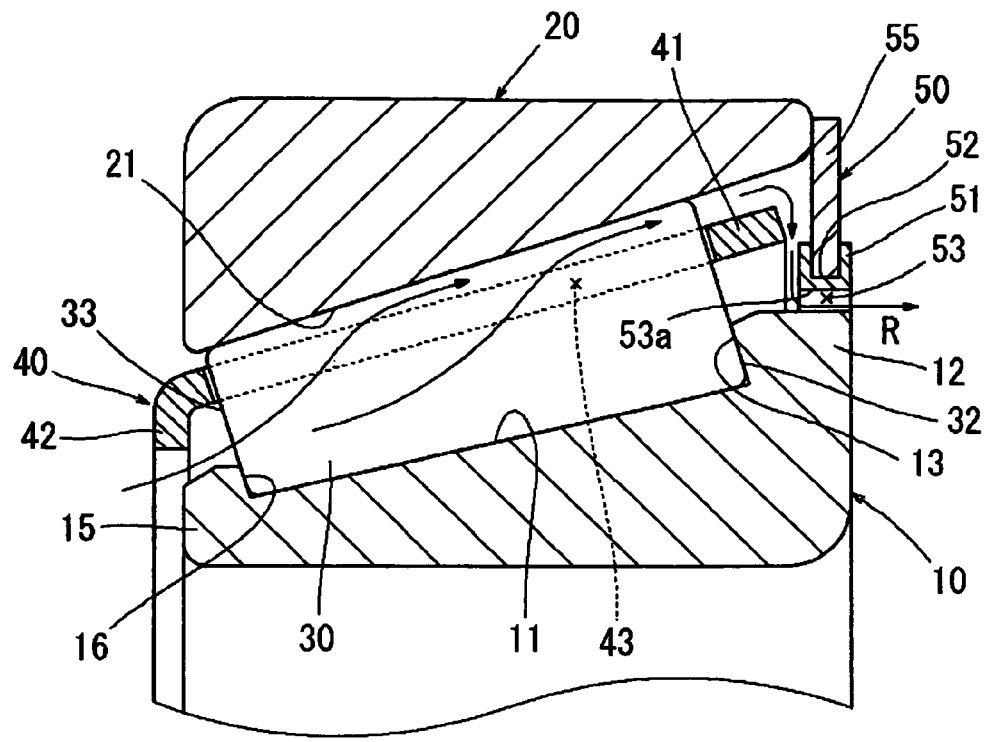
FIG. 3 is a longitudinal cross-sectional view taken along the line III-III of FIG. 4, showing a closed condition of a closing element of an oil guide member on an enlarged scale.
Figure 4:
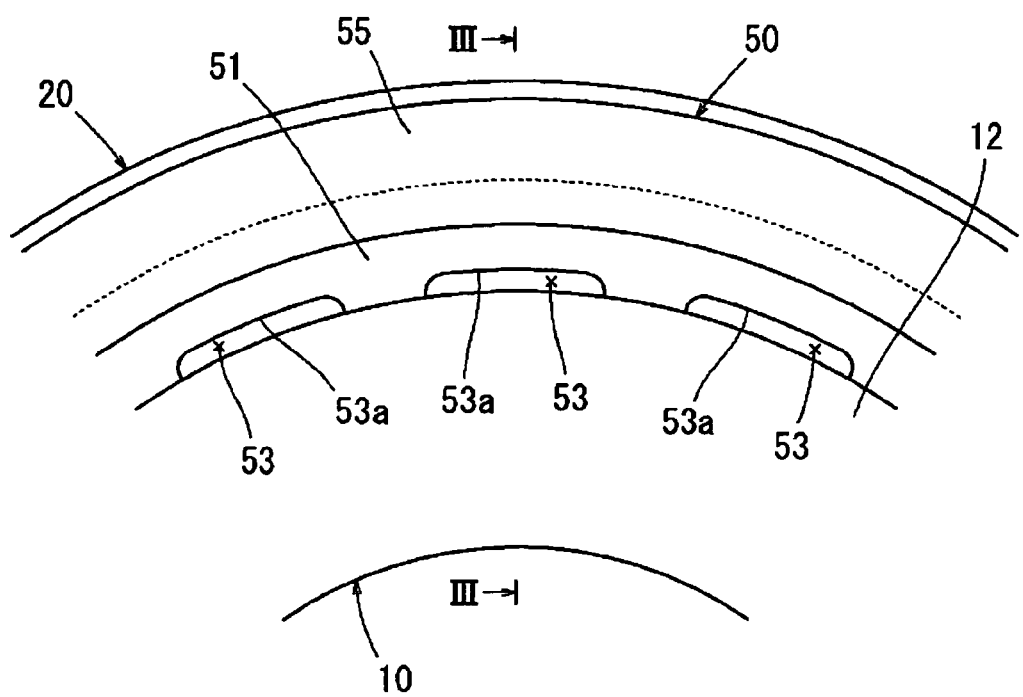
FIG. 4 is a rear view as seen in a direction of arrow IV of FIG. 1, showing a condition in which the oil guide member is mounted on an outer peripheral surface of a rib of an inner ring.
Figure 5:
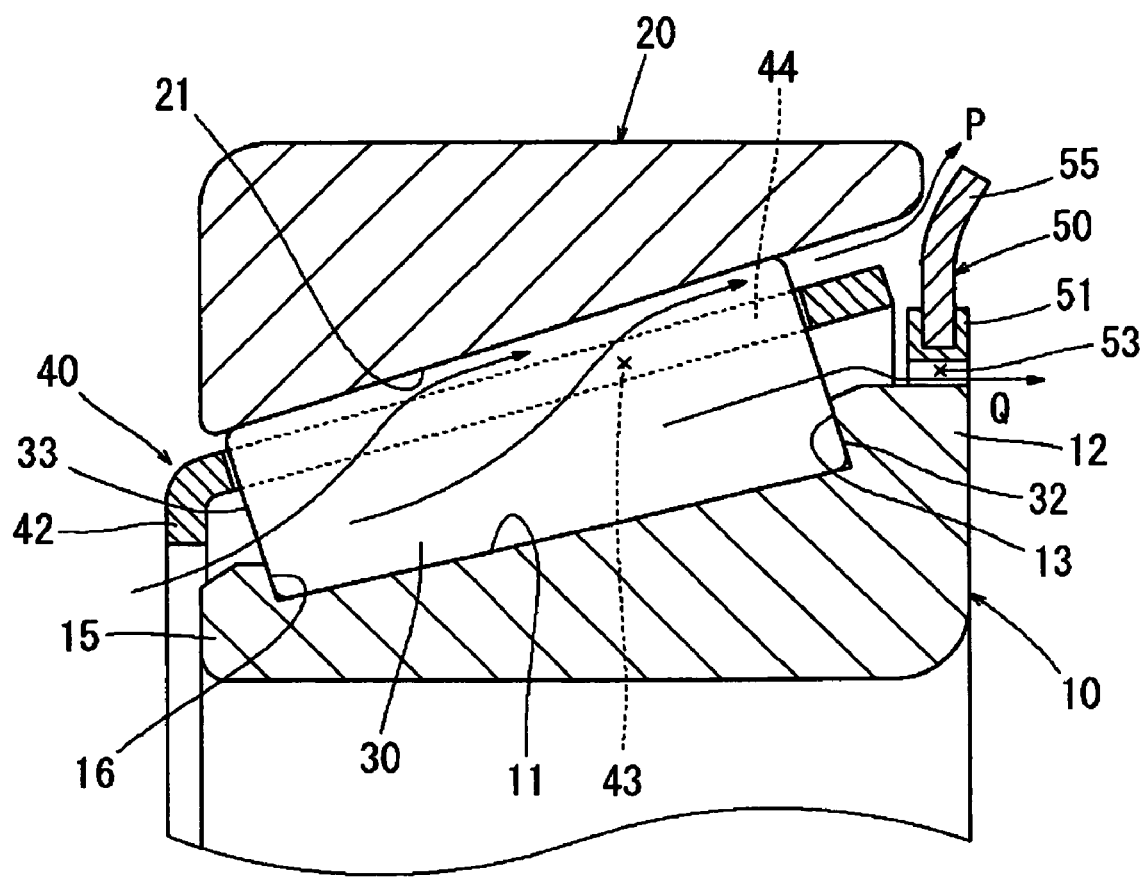
FIG. 5 is an explanatory view showing a condition in which the closing element of the oil guide member is elastically deformed by a fluid pressure of lubricating oil, and is opened.

FIG. 1 is a longitudinal cross-sectional view showing the first embodiment of a tapered roller bearing of the invention. FIG. 2 is a transverse cross-sectional view taken along the line II-II of FIG. 1. FIG. 3 is a longitudinal cross-sectional view taken along the line III-III of FIG. 4, showing a closed condition of a closing element of an oil guide member on an enlarged scale. FIG. 4 is a rear view as seen in a direction of arrow IV of FIG. 1, showing a condition in which the oil guide member is mounted on an outer peripheral surface of a rib of an inner ring. FIG. 5 is an explanatory view showing a condition in which the closing element of the oil guide member is elastically deformed by a fluid pressure of lubricating oil, and is opened.

As shown in FIGS. 1 and 2, the tapered roller bearing comprises the inner ring 10, an outer ring 20, a plurality of tapered rollers 30, a cage 40, and the oil guide member 50.

The inner ring 10 has a tapered raceway surface 11 formed on an outer peripheral surface thereof, and a large rib 12 and a small rib 15 are formed respectively at opposite end portions of the raceway surface 11.

A tapered raceway surface 21 is formed on an inner peripheral surface of the outer ring 20 in opposed relation to the raceway surface 11 of the inner ring 10. The plurality of tapered rollers 30 are rollably disposed between the raceway surfaces 11 and 21 of the inner and outer rings 10 and 20, and a large end surface 32 of each of the tapered rollers 30 is slidingly guided by a roller guide surface 13 of the rib 12 of the inner ring 10, while a small end surface 33 of each tapered roller 30 is slidingly guided by a roller guide surface 16 of the small rib 15.

As shown in FIGS. 1 and 2, the cage 40 for holding the plurality of tapered rollers 30 between the raceway surfaces 11 and 21 of the inner and outer rings 10 and 20 is formed by pressing a metal sheet, and this cage 40 is formed into a taped shaped so as to be inserted between the two raceway surfaces 11 and 21.

The cage 40 includes a large annular portion 41, a small annular portion 42, and a plurality of pillar portions 44 interconnecting the two annular portions 41 and 42 and defining, together with the two annular portions 41 and 42, pockets 43 for respectively holding the plurality of tapered rollers 30. The cage 40 is formed into a generally tapered shape as a whole.

As shown in FIGS. 3 and 4, the oil guide member 50 for openably closing an annular opening between an outer peripheral surface of the rib 12 of the inner ring 10 and the outer ring 20 is mounted on that portion of the outer peripheral surface of the rib 12 disposed adjacent to a large end surface of the inner ring 10.

The oil guide member 50 comprises a mounting element 51 provided at an inner peripheral side thereof, and the closing element (closing portion) 55 provided at an outer peripheral side thereof.

The mounting element 51 is made of a rigid material such as a metallic material or a synthetic resin, and is formed into an annular shape. This mounting element 51 is press-fitted at its inner periphery on the outer peripheral surface of the rib 12 of the inner ring 10, and therefore is fixed thereto.

Discharge ports 53 for discharging lubricating oil, flowing from the small rib (15) side of the inner ring 10 toward the rib (12) side thereof, along the outer peripheral surface of the rib 12 are formed in the mounting element 51.

In this first embodiment, a plurality of recesses 53a are formed in an inner peripheral surface of the mounting element 51, and extend from one side surface of the mounting element 51 to the other side surface thereof, and are arranged at predetermined intervals in a circumferential direction. The plurality of recesses 53a cooperate with the outer peripheral surface of the rib 12 to form the through hole-like discharge ports 53.

As shown in FIG. 3, an annular recess 52 is formed in the outer peripheral surface of the mounting element 51 of the oil guide member 50, and is disposed generally centrally of a thickness thereof (that is, a thickness thereof in an axial direction). The closing element 55 is mounted in this annular recess 52, so that the closing element 55 and the mounting element 51 jointly form the oil guide member 50.

In this first embodiment, the closing element 55 is made of an elastic material such as an elastically-deformable resin or rubber, and is formed into an annular shape. This closing element 55 is fitted at its inner peripheral portion in the annular recess 52 of the mounting element 51, and thus is mounted on the mounting element 51 in integrally connected relation thereto. An outer peripheral portion of the closing element 55 serves as an abutment portion which openably closes the annular opening between the outer peripheral surface of the rib 12 of the inner ring 10 and the outer ring 20.

The lubricating oil is supplied to the small rib (15) side of the inner ring 10, and flows toward the rib 12, and an elastic force of the closing element 55 is so set that when a fluid pressure of that portion of the lubricating oil which flows through the pockets 43 of the cage 40 toward the inner peripheral surface of the outer ring 20 is below a predetermined value, the closing element 55 keeps the annular opening closed by its own elastic force and that when the fluid pressure of this lubricating oil exceeds the predetermined value, the closing element 55 is elastically deformed or bent by the fluid pressure of the lubricating oil, and therefore opens the annular opening.

The tapered roller bearing of this first embodiment has the above arrangement.

Therefore, when the amount of the lubricating oil supplied to the small rib (15) side of the inner ring 10 during the rotation of the bearing is large, so that the fluid pressure of the lubricating oil flowing through the pockets 43 of the cage 40 toward the inner peripheral surface of the outer ring 20 exceeds the predetermined value, the lubricating oil flowing through the pockets 43 toward the inner peripheral surface of the outer ring 20 elastically deforms or bends the closing element 55, and therefore is discharged while opening the closing element 55 as indicated by arrow P (in FIG. 5).

Also, during the rotation of the bearing, part of the lubricating oil supplied to the small rib (15) side of the inner ring 10 flows along the inner peripheral surface of the cage 40, and then is discharged through the discharge ports 53 of the oil guide member 50 as indicated by arrow Q (in FIG. 5).

Thus, when the amount of the lubricating oil supplied to the small rib (15) side of the inner ring 10 is large, so that the amount of the lubricating oil passing through the interior of the tapered roller bearing is large, the lubricating oil is discharged while opening the closing element 55, and the lubricating oil is discharged also through the discharge ports 53. Therefore, the residing of the lubricating oil within the tapered roller bearing can be suppressed, and a torque loss due to an oil agitation loss caused by the residing lubricating oil can be reduced.

When the amount of the lubricating oil supplied to the small rib (15) side of the inner ring 10 is small during the rotation of the bearing, so that the fluid pressure of the lubricating oil flowing through the pockets 43 toward the inner peripheral surface of the outer ring 20 is below the predetermined value, the annular opening between the outer peripheral surface of the rib 12 of the inner ring 10 and the outer ring 20 is closed by the closing element 55 of the oil guide member 55 as shown in FIG. 3.

Therefore, during the time of high-speed rotation when the amount of the lubricating oil supplied to the small rib (15) side of the inner ring 10 is small, and also the centrifugal force is large, the lubricating oil flowing through the pockets 43 of the cage 40 toward the inner peripheral surface of the outer ring 20 is guided along the inner surfaces of the closing element 55 and mounting element 51 of the oil guide member 50, and is directed toward the outer peripheral surface of the rib 12 of the inner ring 10 as indicated by arrow R (in FIG. 3). Then, the lubricating oil flows past the outer peripheral surface of the rib 12 of the inner ring 10, and is discharged through the discharge ports 53. At this time, the rib 12 of the inner ring 10 is cooled by the lubricating oil flowing toward the outer peripheral surface of the rib 12, and also part of the lubricating oil flows to be supplied to the area of contact between the large end surface 32 of each tapered roller 30 and the roller guide surface 13 of the rib 12 of the inner ring 10.

As described above, the lubricating oil flowing through the pockets 43 of the cage 40 toward the inner peripheral surface of the outer ring 20 can be guided toward the outer peripheral surface of the rib 12 of the inner ring 10 by the oil guide member 50. Therefore, the lubricating oil can be efficiently supplied to the area of contact between the large end surface 32 of each tapered roller 30 and the roller guide surface 13 of the rib 12 of the inner ring 10. As a result, the amount of supply of the lubricating oil can be reduced, so that the low-torque design of the tapered roller bearing can be achieved. And besides, seizure due to an insufficient supply of lubricating oil to the area of contact between the large end surface 32 of each tapered roller 30 and the roller guide surface 13 of the rib 12 of the inner ring 10 can be prevented.

In this first embodiment, the oil guide member 50 is press-fitted on the outer peripheral surface of the rib 12 of the inner ring 10 through the mounting element 51 made of the rigid material such as metal or a synthetic resin, and therefore the oil guide member 50 is firmly fixed to the inner ring 10 in a satisfactory manner.

The closing element 55 can be easily formed using the elastic material such as an elastically-deformable resin or rubber having a predetermined elastic force. Thus, the oil guide member 50 is formed by the mounting element 51 and the closing element 55, and by doing so, the oil guide member 50 much simplified in structure can be provided at a low cost.

The present invention is not limited to the above first embodiment.

For example, in the above first embodiment, the plurality of recesses 53a are formed in the inner peripheral surface of the mounting element 51, and are arranged at the predetermined intervals in the circumferential direction, and the plurality of recesses 53a cooperate with the outer peripheral surface of the rib 12 to form the through hole-like discharge ports 53. However, instead of providing the plurality of recesses 53a, through holes (serving as discharge ports) each having a round, an oval, a square or any other suitable shape can be formed through the mounting element 51.

Furthermore, in the above first embodiment, the inner peripheral portion of the closing element 55 is fitted in the annular recess 52 formed in the outer peripheral surface of the mounting element 51 of the oil guide member 50, and is thus mounted on the mounting element 51. However, the provision of the annular recess 52 can be omitted, in which case the closing element 55 is fixedly mounted on one side surface of the mounting element 51 by suitable fastening elements such as screws.

Furthermore, in the above first embodiment, the oil guide member 50 comprises the two parts, that is, the rigid mounting element 51 and the closing element 55 made of the elastic material. However, the oil guide member 50 can be formed into a one-piece arrangement (that is, can comprise one part), using a metallic material or a synthetic resin.

However, in the case where the oil guide member 50 comprises one part made of such a metallic material, the closing element 55 is formed into a thin configuration so as to be elastically deformed.

In the case where the oil guide member 50 comprises one part, discharge ports are formed in the inner peripheral portion (corresponding to the mounting element 51) of the oil guide member 50.

Second Embodiment

A second embodiment of the present invention will now be described with reference to FIGS. 6 to 10.

Figure 6:
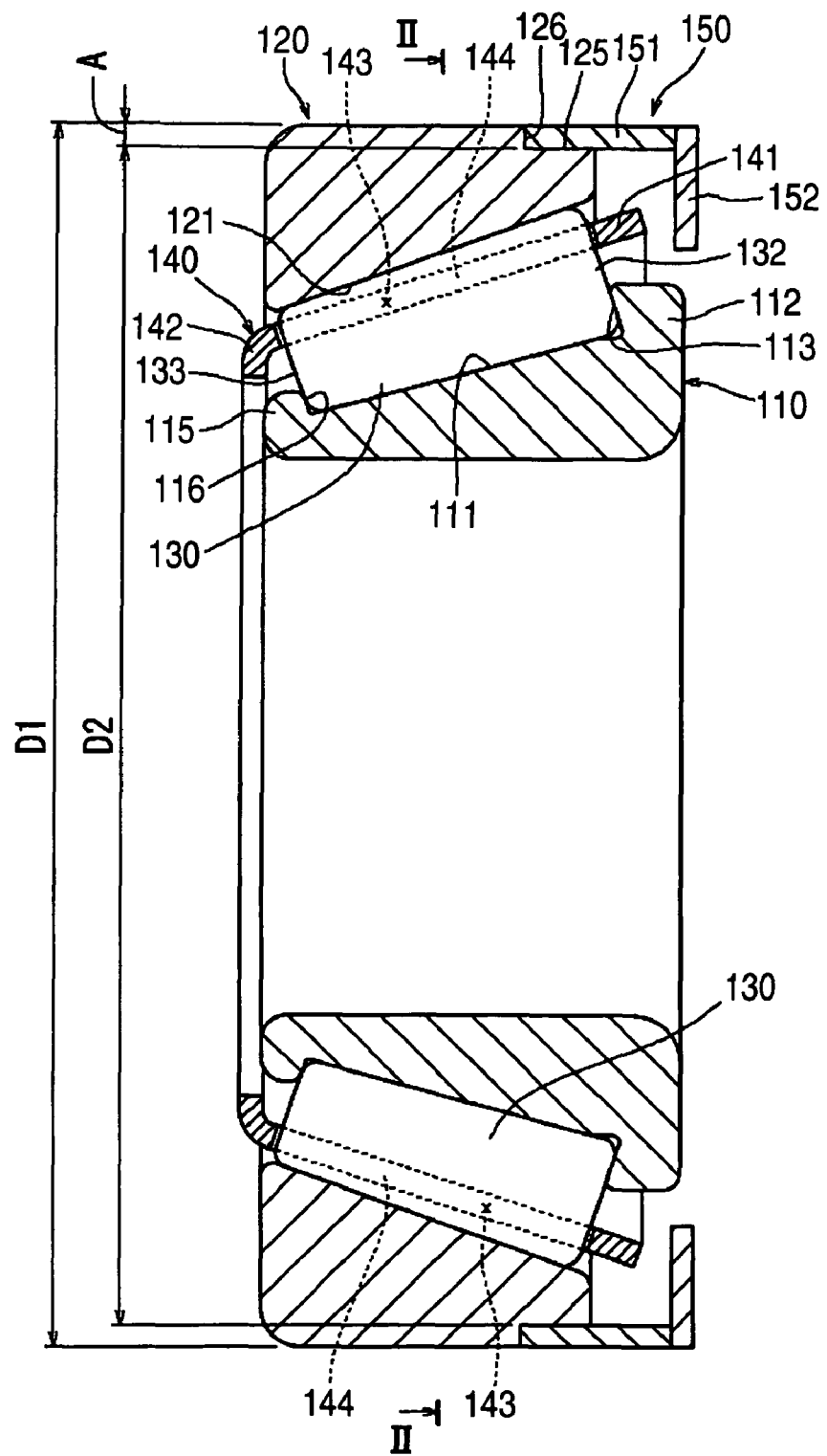
FIG. 6 is a longitudinal cross-sectional view showing a tapered roller bearing according to a second embodiment of the present invention.
Figure 7:
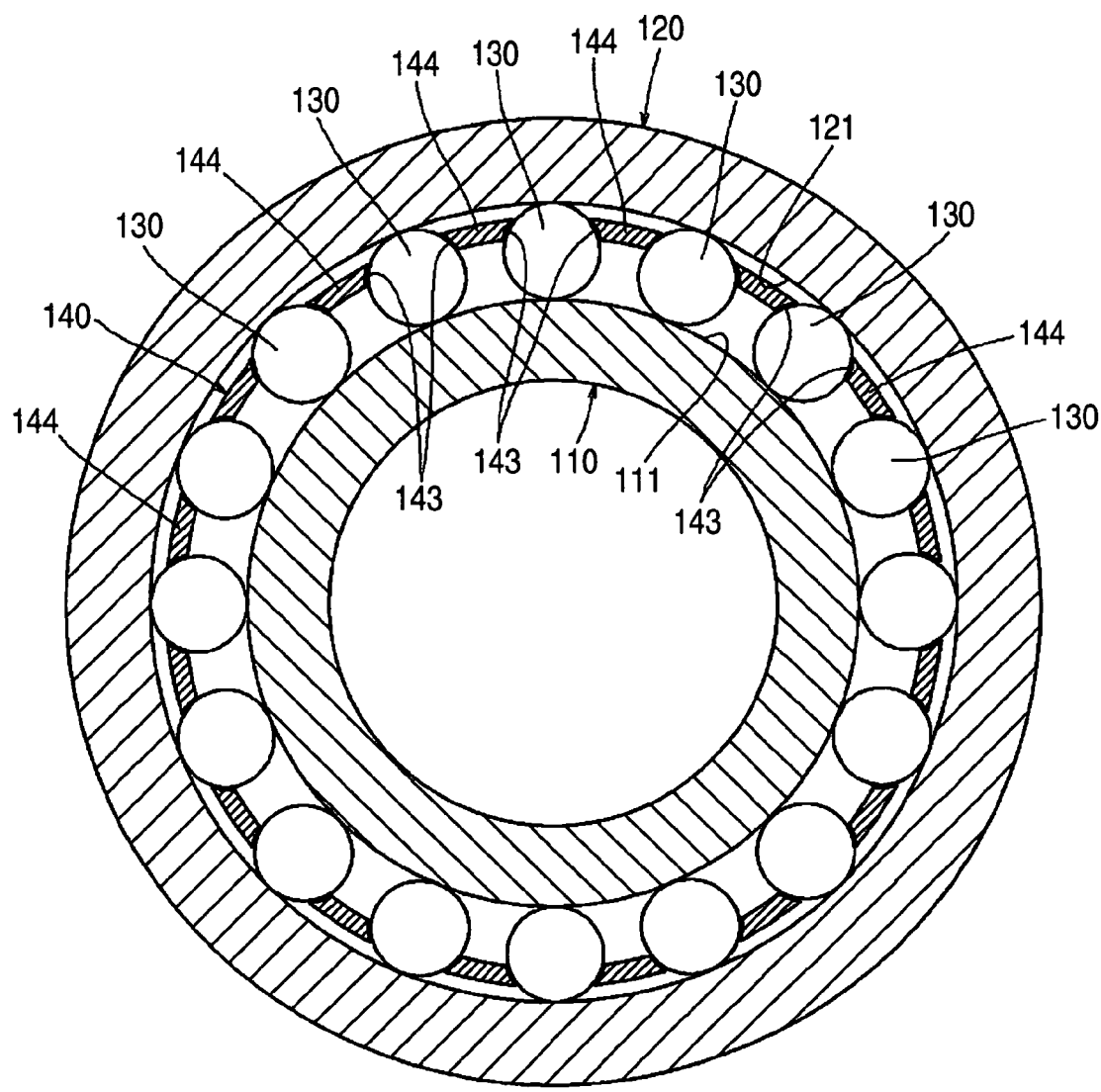
FIG. 7 is a transverse cross-sectional view taken along the line II-II of FIG. 6.
Figure 8:
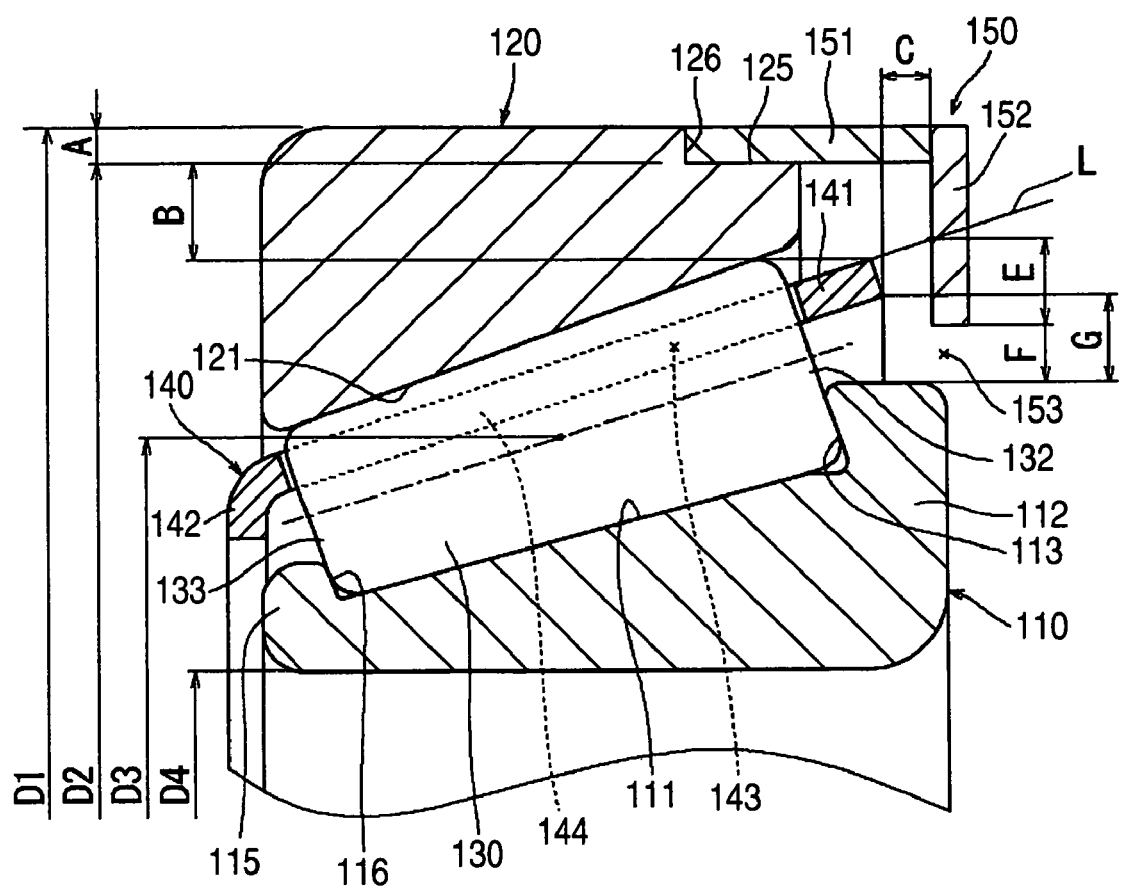
FIG. 8 is a cross-sectional view showing the mounting relationship of an inner ring, an outer ring, tapered rollers, a cage and an oil guide member.
Figure 9:
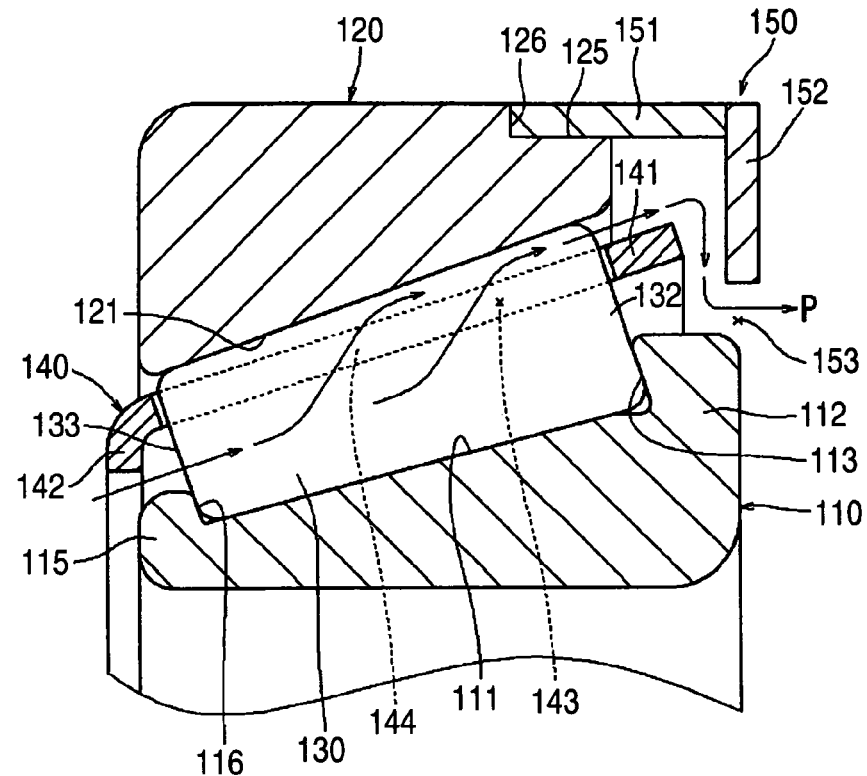
FIG. 9 is an explanatory view showing a flow of lubricating oil during the rotation of the bearing.
Figure 10:
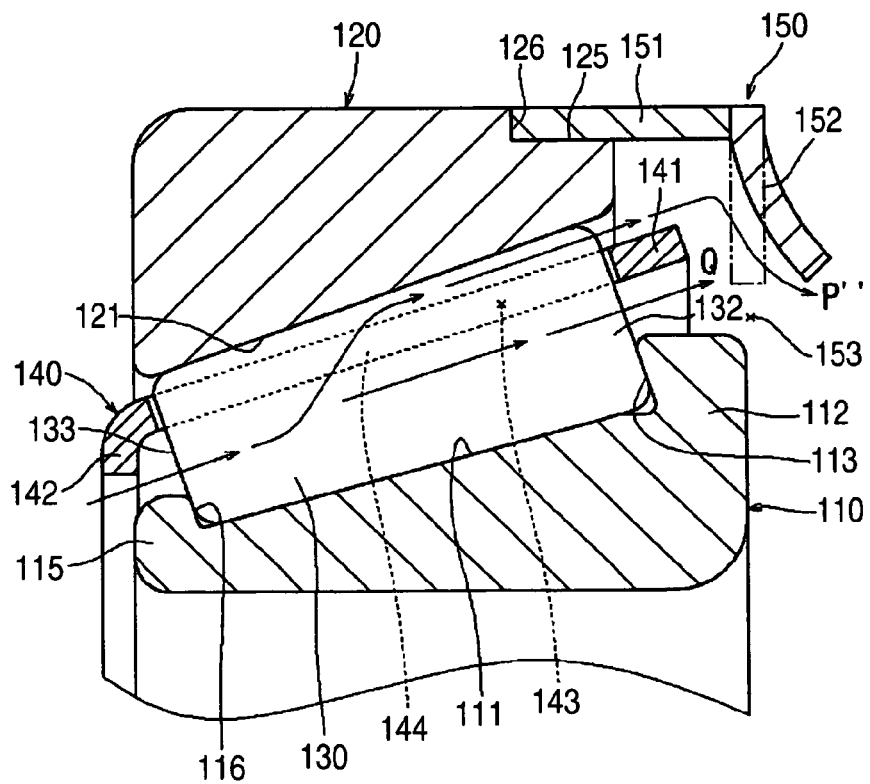
FIG. 10 is an explanatory view showing a condition in which an annular element of the oil guide member is elastically deformed by a fluid pressure of the lubricating oil in a direction to expand a discharge port.

FIG. 6 is a longitudinal cross-sectional view showing the second embodiment of a tapered roller bearing of the invention. FIG. 7 is a transverse cross-sectional view taken along the line II-II of FIG. 6. FIG. 8 is a cross-sectional view showing the mounting relationship of an inner ring, an outer ring, tapered rollers, a cage and an oil guide member. FIG. 9 is an explanatory view showing a flow of lubricating oil during the rotation of the bearing. FIG. 10 is an explanatory view showing a condition in which an annular element of the oil guide member is elastically deformed by a fluid pressure of the lubricating oil in a direction to expand a discharge port.

As shown in FIGS. 6 and 7, the tapered roller bearing comprises the inner ring 110, the outer ring 120, the plurality of tapered rollers 130, the cage 140, and the oil guide member 150.

The inner ring 110 has a tapered raceway surface 111 formed on an outer peripheral surface thereof, and the large rib 112 and a small rib 115 are formed respectively at opposite end portions of the raceway surface 111.

A tapered raceway surface 121 is formed on an inner peripheral surface of the outer ring 120 in opposed relation to the raceway surface 111 of the inner ring 110. The plurality of tapered rollers 130 are rollably disposed between the raceway surfaces 111 and 121 of the inner and outer rings 110 and 120, and a large end surface 132 of each of the tapered rollers 130 is slidingly guided by a roller guide surface 113 of the rib 112 of the inner ring 110, while a small end surface 133 of each tapered roller 130 is slidingly guided by a roller guide surface 116 of the small rib 115.

As shown in FIGS. 6 and 7, the cage 140 for holding the plurality of tapered rollers 130 between the raceway surfaces 111 and 121 of the inner and outer rings 110 and 120 is formed by pressing a metal sheet, and this cage 140 is formed into a taped shaped so as to be inserted between the two raceway surfaces 111 and 121.

The cage 140 includes a large annular portion 141, a small annular portion 142, and a plurality of pillar portions 144 interconnecting the two annular portions 141 and 142 and defining, together with the two annular portions 141 and 142, pockets 143 for respectively holding the plurality of tapered rollers 130. The cage 140 is formed into a generally tapered shape as a whole.

As shown in FIGS. 6 and 8, an outer peripheral surface of one end portion (corresponding to the rib of the outer ring 120) of the outer ring 120 is reduced in diameter by an amount corresponding to a thickness A of a tubular element 151 of the oil guide member 150 (hereafter more fully described) to thereby provide a fitting portion 125.

In order to secure an outer ring thickness equal to a thickness of a conventional ordinary outer ring, an outside diameter D1 of the outer ring 120 is determined such that an outside diameter D2 of the fitting portion 125 is generally equal to an outside diameter of the conventional ordinary outer ring.

Incidentally, when D4 represents an inside diameter (bore diameter) of the inner ring 110, and D3 represents a pitch circle diameter (PCD) (i.e., a diameter of a pitch circle passing through longitudinally-central portions of the tapered rollers 130) as shown in FIG. 8, a value of 2·D3/(D1+D4) representing a PCD parameter is about 1 in a conventional ordinary tapered roller bearing. On the other hand, in this second embodiment, this value is not more than 0.96.

As shown in FIG. 8, the oil guide member 151 comprises the tubular element 151 fitted on the outer peripheral surface of the fitting portion 125 of the outer ring 120 to be mounted thereon, and the annular element 152 projecting from an end of the tubular portion 151 toward the outer peripheral portion of the rib 112 of the inner ring 110. Lubricating oil is supplied to a small rib (115) side of the inner ring 110, and the oil guide member 150 guides that portion of the lubricating oil which flows through the pockets 143 of the cage 140 toward the inner peripheral surface of the outer ring 120 toward the outer peripheral portion of the rib 112 of the inner ring 110.

In this second embodiment, the tubular element 151 of the oil guide member 150 is formed into a tubular shape, using a rigid material such as a metallic material, a synthetic resin, etc. The tubular element 151 is press-fitted on the fitting portion 125 of the outer ring 120 until its end is brought into abutting engagement with a step surface 126 at an inner end of the fitting portion 125, and by doing so, the tubular element 151 is mounted on the fitting portion 125. In this mounted condition, the outer peripheral surface of the outer ring 120 and the outer peripheral surface of the tubular element 151 cooperate with each other to form a generally continuous cylindrical surface.

In the mounted condition of the tubular element 151, an inner peripheral surface of this tubular element 151 is radially spaced a predetermined distance B from an outer peripheral edge of an end surface of the large annular portion 141 of the cage 140 as shown in FIG. 8.

The end portion of the tubular element 151 projects axially beyond an end surface of the outer ring 120, and the annular element 152 is integrally connected to and projects from this projecting end portion toward the outer peripheral surface of the rib 112 of the inner ring 110 in such a manner that the annular element 152 is spaced a predetermined distance C from an inner peripheral edge of the end surface of the large annular portion 141 of the cage 140.

The annular element 152 is made of an elastic material such as an elastically-deformable resin, rubber, etc., and is integrally joined at its outer peripheral portion to the projecting end of the tubular element 151 by bonding, fitting or other means. An inner peripheral edge of the annular element 152 projects a distance E beyond a point of intersection of an extension L of the outer peripheral surface of the large annular portion 141 of the cage 140 and an inner side surface of the annular element 152 toward the center of the bearing.

Also, the inner peripheral edge of the annular element 152 is spaced a distance F from the outer peripheral surface of the rib 112 of the inner ring 110 to form a discharge port 153 for lubricating oil therebetween.

In order to achieve a smooth flow of the lubricating oil, the distance B as well as the distance C is preferably 1.5 mm or more.

Preferably, the distance F is so set that the formula, (F≧G/2), can be established, where G represents a distance between the outer peripheral surface of the rib 112 of the inner ring 110 and the inner peripheral edge of the end surface of the large annular portion 141 of the cage 140.

The tapered roller bearing of this second embodiment has the above arrangement.

During the rotation of the bearing, that portion of the lubricating oil (supplied to the small rib (115) side of the inner ring 110) which flows through the pockets 143 of the cage 140 toward the inner peripheral surface of the outer ring 120 flows or passes through a space between the inner peripheral surface (bore surface) of the outer ring 120 and the outer peripheral surface of the cage 140 as indicated by arrow P (in FIG. 9). Then, the lubricating oil is guided by the tubular element 151 and the annular element 152 of the oil guide member 150, and flows toward the outer peripheral surface of the rib 112 of the inner ring 110, and then is discharged through the discharge port 153 between the inner peripheral edge of the annular element 152 and the outer peripheral surface of the rib 112 of the inner ring 110. At this time, the rib 112 of the inner ring 110 is cooled by the lubricating oil flowing toward the outer peripheral surface of the rib 112, and also part of the lubricating oil flows to be supplied to the area of contact between the large end surface 132 of each tapered roller 130 and the roller guide surface 113 of the rib 112 of the inner ring 110.

Therefore, even during the time of high-speed rotation when the amount of the lubricating oil supplied to the small rib (115) side of the inner ring 110 is small, and also the centrifugal force is large, the lubricating oil can be efficiently supplied to the area of contact between the large end surface 132 of each tapered roller 130 and the roller guide surface 113 of the rib 112 of the inner ring 110. As a result, the amount of supply of the lubricating oil can be reduced, so that a low-torque design of the tapered roller bearing can be achieved. And besides, seizure due to an insufficient supply of lubricating oil can be prevented.

Furthermore, in this second embodiment, the inner peripheral edge of the annular element 152 of the oil guide member 150 projects the distance E beyond the point of intersection of the extension L of the outer peripheral surface of the large annular portion 141 of the cage 140 and the inner side surface of the annular element 152 toward the center of the bearing. Therefore, the lubricating oil passing through the space between the inner peripheral surface of the outer ring 120 and the outer peripheral surface of the cage 140 will not flow linearly toward the discharge port 153, and hence will not be discharged directly through this discharge port 153, and instead this lubricating oil impinges on the inner side surface of the annular element 152 of the oil guide member 150, and is guided toward the outer peripheral surface of the rib 112 of the inner ring 110.

Therefore, the lubricating oil can be more efficiently supplied to the area of contact between the large end surface 132 of each tapered roller 130 and the roller guide surface 113 of the rib 112 of the inner ring 110.

When the amount of the lubricating oil supplied to the small rib (115) side of the inner ring 110 is large, that portion of the lubricating oil which flows through the pockets 143 of the cage 140 toward the inner peripheral surface of the outer ring 120 (as indicated by arrow P" in FIG. 10) and that portion of the lubricating oil which flows along inner surfaces of the pillar portions 144 of the cage 140 (as indicated by arrow Q in FIG. 10) both impinge on the inner side surface of the annular element 152 of the oil guide member 150. These flows of lubricating oil elastically deform the annular element 152 of the oil guide member 150 in a direction to expand the discharge port 153, and are smoothly discharged through the discharge port 153. Therefore, the residing of the lubricating oil within the tapered roller bearing can be suppressed, and a torque loss due to an oil agitation loss caused by the residing lubricating oil can be reduced.

Furthermore, in this second embodiment, the tubular element 151 of the oil guide member 150 is fitted on the fitting portion 125 of the outer ring 120 until the end of this tubular element 151 is brought into abutting engagement with the step surface 126 at the inner end of the fitting portion 125, as shown in FIG. 8. By doing so, the tubular element 151 of the oil guide member 150 can be accurately mounted on the fitting portion 125 of the outer ring 120 without being deviated from its proper position in the axial direction.

Furthermore, when the tubular element 151 of the oil guide member 150 is mounted on the fitting portion 125 of the outer ring 120, the outer peripheral surface of the outer ring 120 and the outer peripheral surface of the tubular element 151 cooperate with each other to form the generally continuous cylindrical surface. Therefore, when mounting the tapered roller bearing on a housing by fitting the outer ring 120 in a mounting hole in the housing, the tubular element 151 of the oil guide member 150 will not prevent this mounting operation.

As a result, the outer ring 120 can be easily fitted into the mounting hole in the housing, thereby mounting the tapered roller bearing.

The present invention is not limited to the above second embodiment.

For example, in the above second embodiment, the oil guide member 150 comprises the two parts, that is, the rigid tubular element 151 and the annular element 152 made of the elastic material (such as resin, rubber, etc.). However, as shown in FIG. 11, the oil guide member 150 can be formed into a one-piece arrangement (that is, can comprise one part), using a metallic material or an elastic material, in which case a tubular portion 151 and an annular portion 152 are formed integrally with each other.

However, in the case where the oil guide member 150 comprises one part made of such a metallic material, the annular portion 152 is formed into a thin configuration so as to be elastically deformed.

Figure 12:
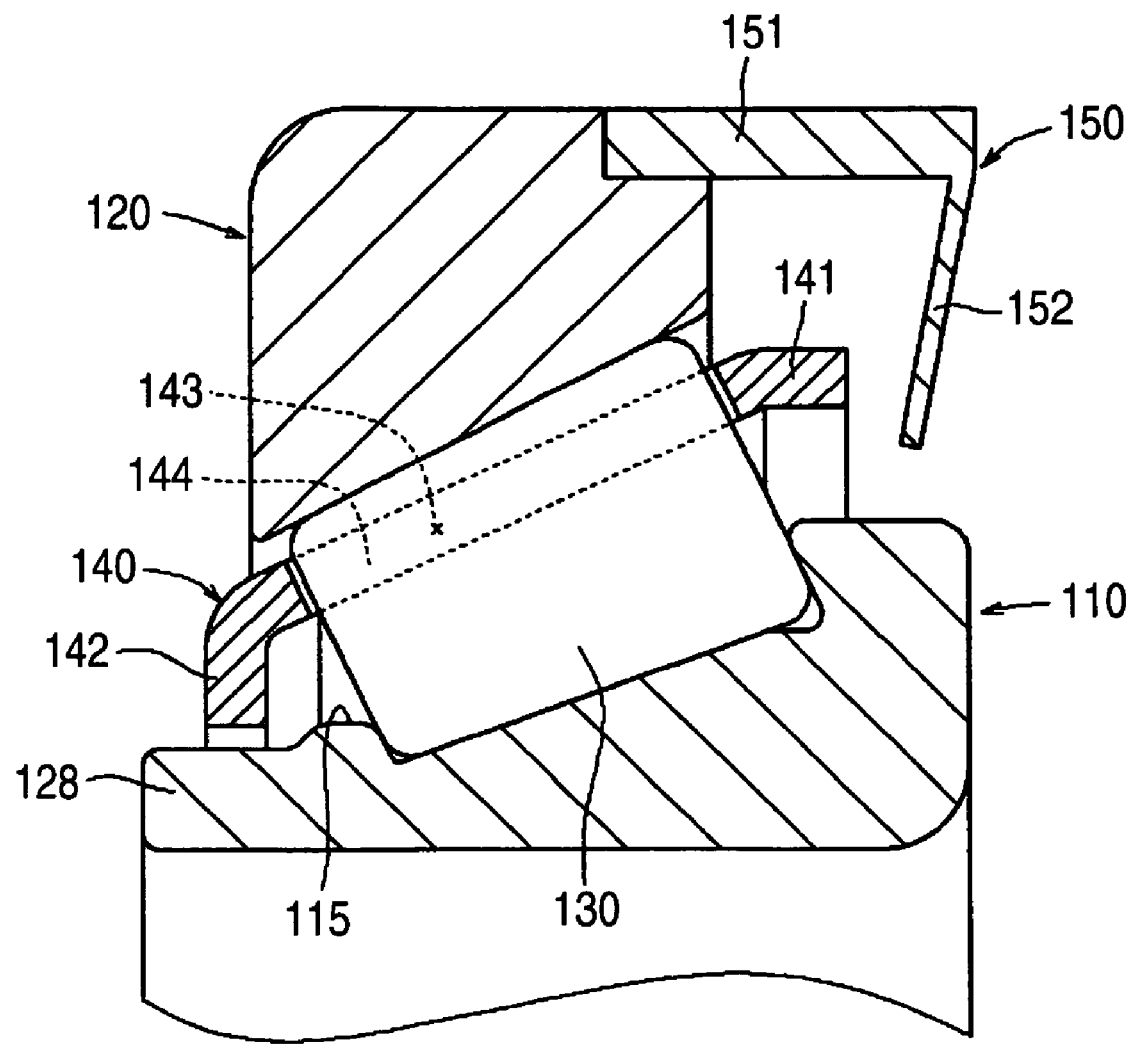
FIG. 12 is a cross-sectional view of a further modification of the second embodiment of the invention in which an annular portion of the oil guide member is formed into a tapered shape.

Furthermore, the annular portion (or annular element) 152 may be formed into a tapered shape (as shown in FIG. 12) or a curved shape such that its inner peripheral edge is disposed closer to the large end surfaces 132 of the tapered rollers 130 than its outer peripheral edge (integrally connected to the tubular portion 151) is.

Figure 11:
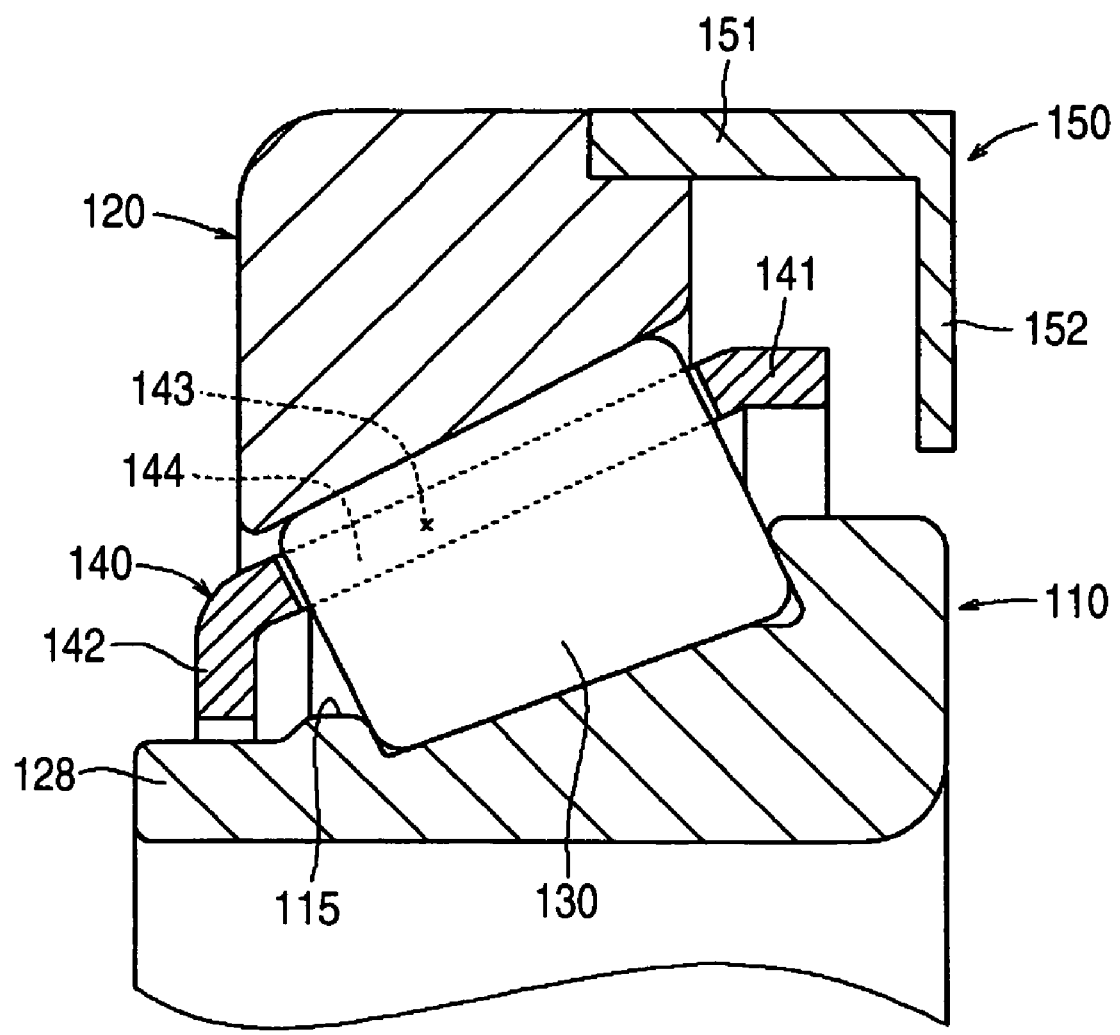
FIG. 11 is a cross-sectional view of a modification of the second embodiment of the invention in which an oil guide member comprises one part having a tubular portion and an annular portion which are formed integrally with each other.

Furthermore, as shown in FIGS. 11 and 12, an extension portion 128 may be formed at the small rib (115)-side end of the inner ring 110 in slightly spaced relation to the inner peripheral edge of the small annular portion 142 of the cage 142. With this arrangement, the amount of the lubricating oil to be supplied to the small rib 115 can be reduced. In this case, an excessive supply of lubricating oil can be prevented, and this is effective in achieving the low-torque design.

Third Embodiment

A third embodiment of the present invention will now be described with reference to FIGS. 13 to 16.

Figure 13:
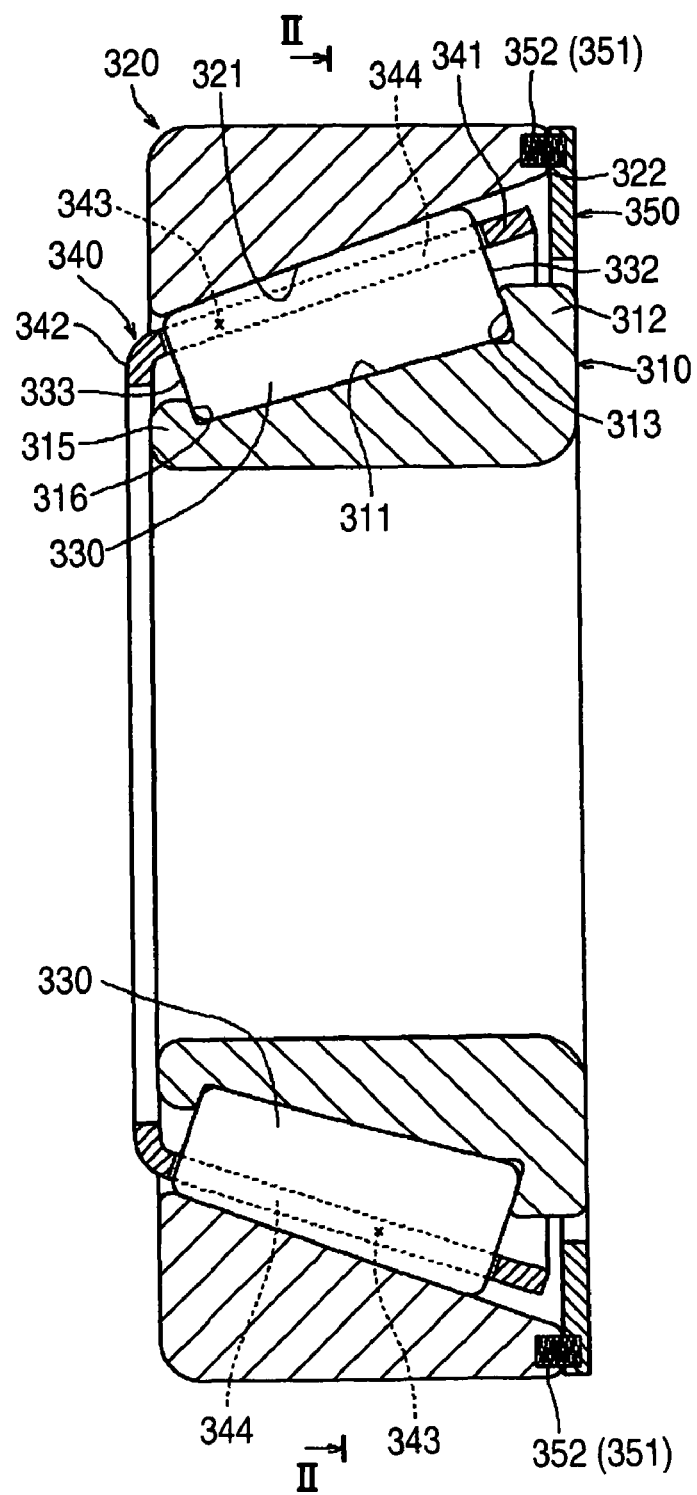
FIG. 13 is a longitudinal cross-sectional view showing a third embodiment of a tapered roller bearing of the present invention.
Figure 14:
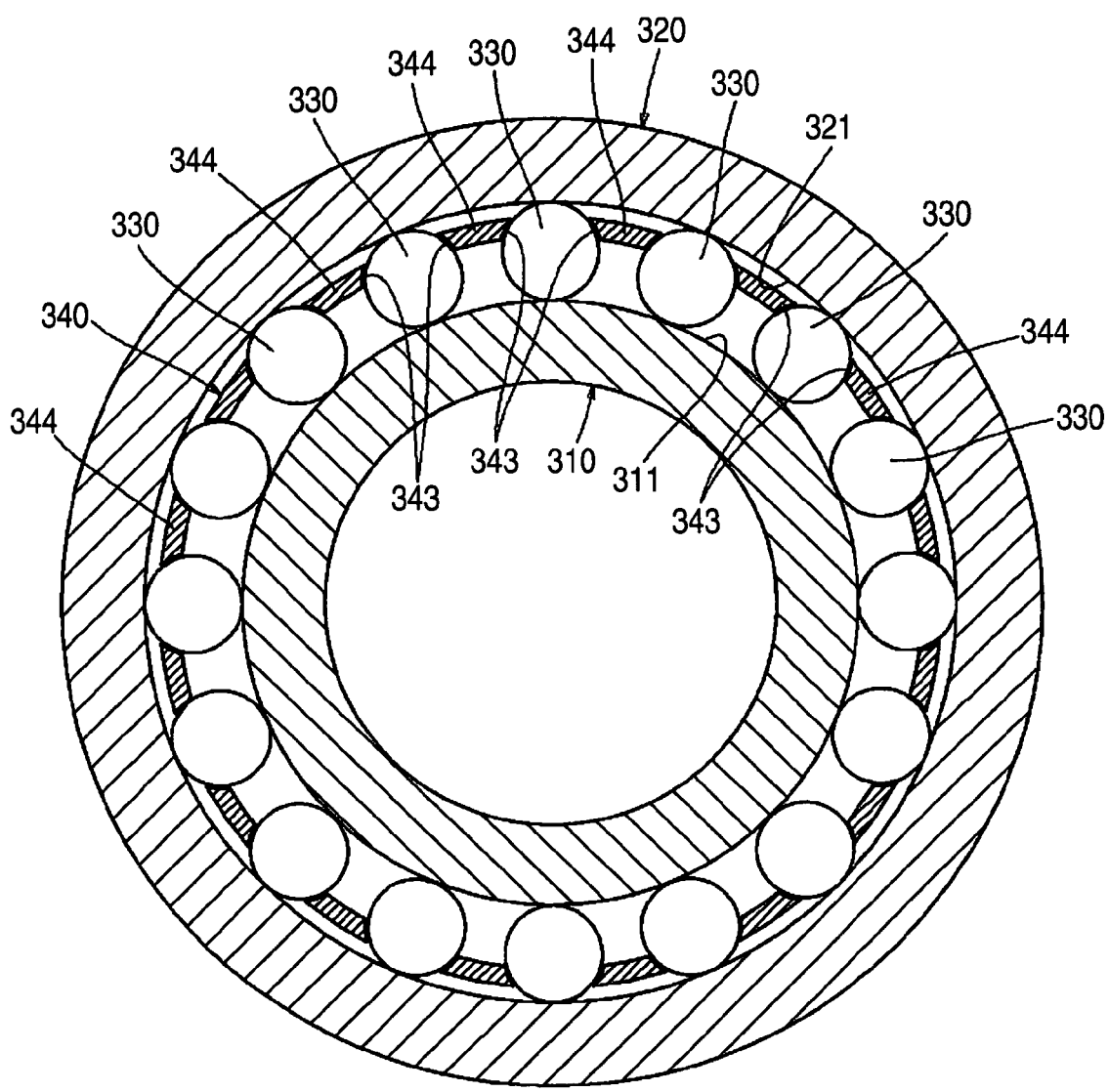
FIG. 14 is a transverse cross-sectional view taken along the line II-II of FIG. 13.
Figure 15:
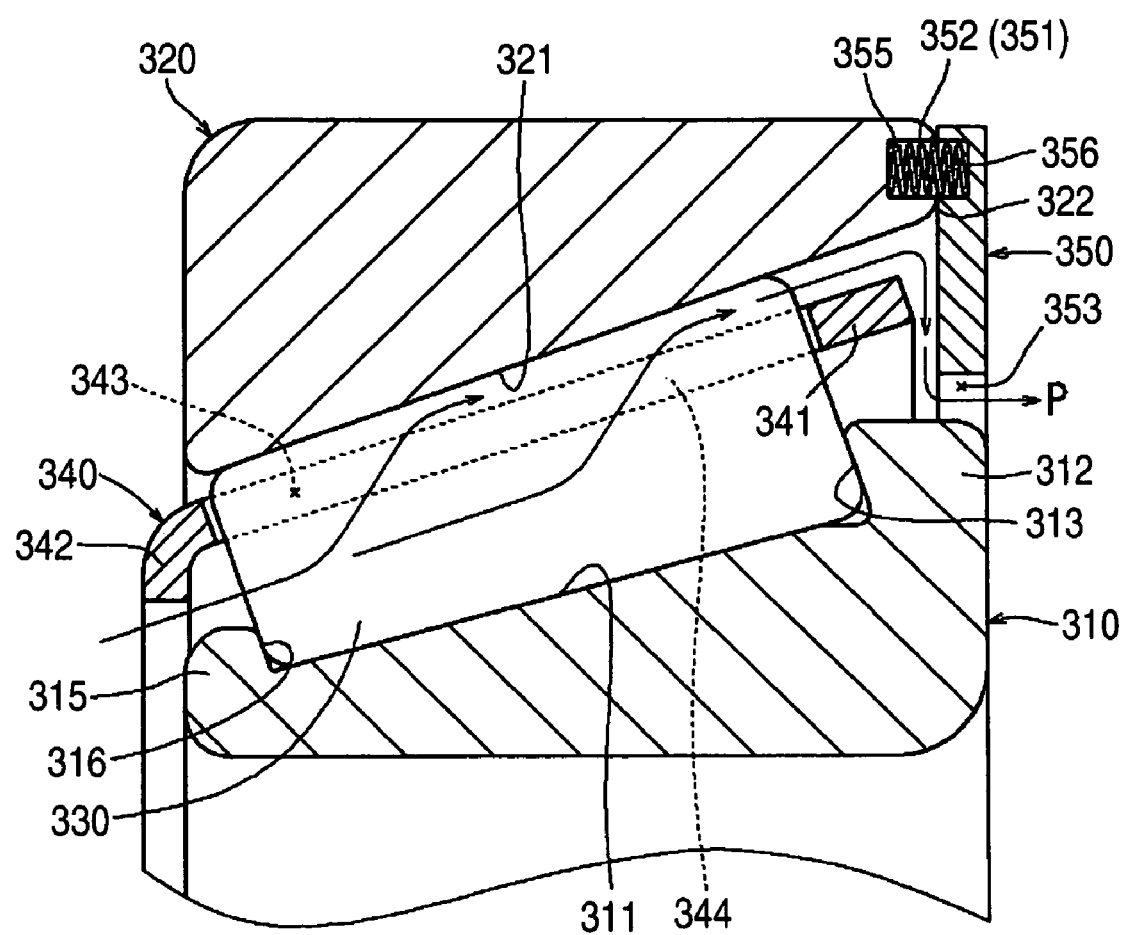
FIG. 15 is an explanatory view showing a flow of lubricating oil during the rotation of the bearing.
Figure 16:
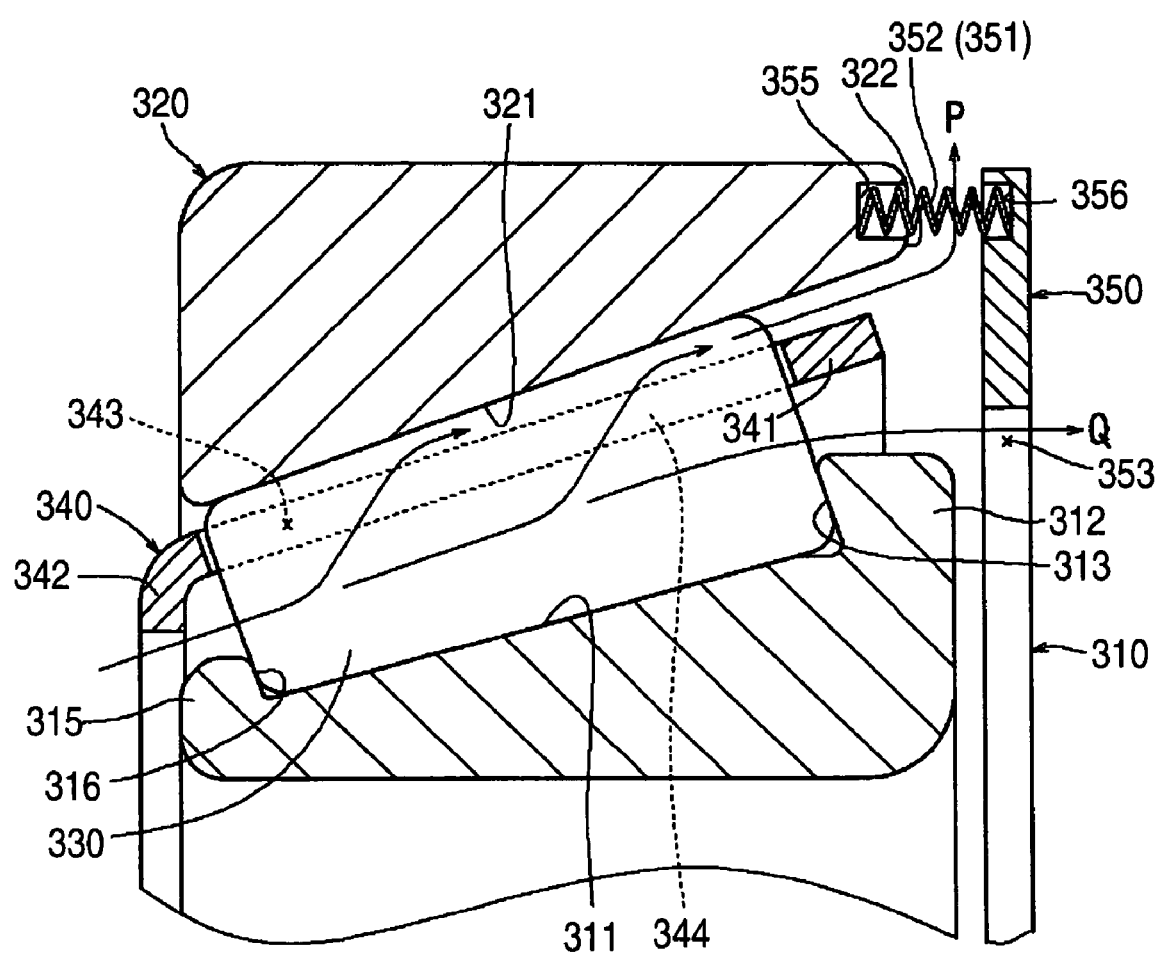
FIG. 16 is an explanatory view showing a condition in which an annular oil guide member is moved away from an end surface of an outer ring into an open condition by a fluid pressure of lubricating oil during the rotation of the bearing.

FIG. 13 is a longitudinal cross-sectional view showing the third embodiment of a tapered roller bearing of the invention. FIG. 14 is a transverse cross-sectional view taken along the line II-II of FIG. 13. FIG. 15 is an explanatory view showing a flow of lubricating oil during the rotation of the bearing. FIG. 16 is an explanatory view showing a condition in which an annular oil guide member is moved away from an end surface of an outer ring into an open condition by a fluid pressure of lubricating oil during the rotation of the bearing.

As shown in FIG. 13, the tapered roller bearing comprises an inner ring 310, an outer ring 320, a plurality of tapered rollers 330, a cage 340, and the annular oil guide member 350.

The inner ring 310 has a tapered raceway surface 311 formed on an outer peripheral surface thereof, and a large rib 312 and a small rib 315 are formed respectively at opposite end portions of the raceway surface 311.

A tapered raceway surface 321 is formed on an inner peripheral surface of the outer ring 320 in opposed relation to the raceway surface 311 of the inner ring 310. The plurality of tapered rollers 330 are rollably disposed between the raceway surfaces 311 and 321 of the inner and outer rings 310 and 320, and a large end surface 332 of each of the tapered rollers 330 is slidingly guided by a roller guide surface 313 of the rib 312 of the inner ring 310, while a small end surface 333 of each tapered roller 330 is slidingly guided by a roller guide surface 316 of the small rib 315.

As shown in FIGS. 13 and 14, the cage 40 for holding the plurality of tapered rollers 330 between the raceway surfaces 311 and 321 of the inner and outer rings 310 and 320 is formed by pressing a metal sheet, and this cage 340 is formed into a taped shaped so as to be inserted between the two raceway surfaces 311 and 321.

The cage 340 includes a large annular portion 341, a small annular portion 342, and a plurality of pillar portions 344 interconnecting the two annular portions 341 and 342 and defining, together with the two annular portions 341 and 342, pockets 343 for respectively holding the plurality of tapered rollers 330. The cage 340 is formed into a generally tapered shape as a whole.

As shown in FIGS. 15 and 16, the annular oil guide member 350 is mounted on that end surface 322 of the outer ring 320, corresponding to the rib (312) side of the inner ring 310, through elastic members 351 so as to be opened and closed. This annular oil guide member 350 serves to guide that portion of lubricating oil (supplied into the bearing from a small rib (315) side of the inner ring 310) which flows through the pockets 343 of the cage 340 toward an inner peripheral surface of the outer ring 320 toward an outer peripheral surface of the rib 312 of the inner ring 310.

The annular oil guide member 350 is formed into an annular shape, using a flat plate such as a metallic plate, a synthetic resin plate, etc. An outside diameter of the annular oil guide member 350 is generally equal to an outside diameter of the outer ring 320, and an inside diameter of the annular oil guide member 350 is larger than an outside diameter of the rib 312 of the inner ring 310. When the annular oil guide member 350 is mounted on the end surface 322 of the outer ring 320 by the elastic members 351 as shown in FIG. 15, an inner peripheral surface (or inner peripheral edge) of the annular oil guide member 350 is spaced a predetermined distance from the outer peripheral surface of the rib 312 of the inner ring 310 to form a discharge port 353 for lubricating oil therebetween.

In this third embodiment, spring receiving recesses 355 are formed in the end surface 322 of the outer ring 320, and spring receiving recesses 356 are formed in that portion of an inner surface of the annular oil guide member 350 opposed to the end surface 322, and are opposed respectively to the receiving recesses 355 as shown in FIG. 15. Opposite ends of a tension coil spring 352 (serving as the elastic member 351) are fixed respectively to bottoms of each mating pair of receiving recesses 355 and 356.

When the amount of the lubricating oil passing through the tapered roller bearing is small, the annular oil guide member 350 is held in contact with the end surface 322 of the outer ring 320 and hence is held in a closed condition by an urging force of the tension coil springs 352, as shown in FIG. 15. In this condition, each tension coil spring 352 is completely received within the corresponding pair of spring receiving recesses 355 and 356.

The urging force (tension) of the tension coil springs 352 is so set that when the amount of the lubricating oil passing through the bearing is large, the annular oil guide member 350 can be moved or displaced away from the end surface 322 of the outer ring 320 into the open condition by the fluid pressure of the lubricating oil against the urging force (tension) of the tension coil springs 352 as shown in FIG. 16.

The tapered roller bearing of this third embodiment has the above arrangement.

Therefore, during the rotation of the bearing, the lubricating oil supplied from the small rib (315) side of the inner ring 310 flows toward the rib 312 by a pumping action caused by a centrifugal force.

In this case, when the amount of the lubricating oil passing through the bearing is small, the annular oil guide member 350 is held in contact with the end surface 322 of the outer ring 320 and hence is held in the closed condition by the urging force of the tension coil springs 352 as shown in FIG. 15. Therefore, that portion of the lubricating oil (supplied from the small rib (315) side of the inner ring 310) which flows through the pockets 343 of the cage 340 toward the inner peripheral surface of the outer ring 320 is guided along the inner surface of the closed annular oil guide member 350, and flows toward the outer peripheral surface of the rib 312 of the inner ring 310 as indicated by arrow P (in FIG. 15), and then is discharged through the discharge port 353 between the inner peripheral edge of the annular oil guide member 350 and the outer peripheral surface of the rib 312 of the inner ring 310. At this time, the rib 312 of the inner ring 310 is cooled by the lubricating oil flowing toward the rib 312, and also part of the lubricating oil flows to be supplied to an area of contact between the large end surface 332 of each tapered roller 330 and the roller guide surface 313 of the rib 312 of the inner ring 310.

The lubricating oil is guided by the annular oil guide member 350 as described above, and therefore even during the time of high-speed rotation when the amount of the lubricating oil supplied from the small rib (315) side of the inner ring 310 is small, and also the centrifugal force is large, the lubricating oil can be efficiently supplied to the area of contact between the large end surface 332 of each tapered roller 330 and the roller guide surface 313 of the rib 312 of the inner ring 310. As a result, the amount of supply of the lubricating oil can be reduced, so that a low-torque design of the tapered roller bearing can be achieved. And besides, seizure due to an insufficient supply of lubricating oil can be prevented.

When the amount of the lubricating oil passing through the bearing is large, that portion of the lubricating oil which flows through the pockets 343 of the cage 340 toward the inner peripheral surface of the outer ring 320 (as indicated by arrow P in FIG. 16) and that portion of the lubricating oil which flows along inner surfaces of the pillar portions 344 of the cage 340 (as indicated by arrow Q in FIG. 16) both impinge on the inner surface of the annular oil guide member 350. Therefore, the annular oil guide member 350 receives the fluid pressure of these flows of lubricating oil, and is displaced away from the end surface 322 of the outer ring 320 into the open condition against the urging force of the tension coil springs 352. As a result, the lubricating oil is smoothly discharged through a clearance between the end surface 322 of the outer ring 320 and the annular oil guide member 350 and also through the discharge port 353. Therefore, the residing of the lubricating oil within the tapered roller bearing can be suppressed, and a torque loss due to an oil agitation loss caused by the residing lubricating oil can be reduced.

Fourth Embodiment

A fourth embodiment of the present invention will be described with reference to FIGS. 17 and 18.

Figure 17:
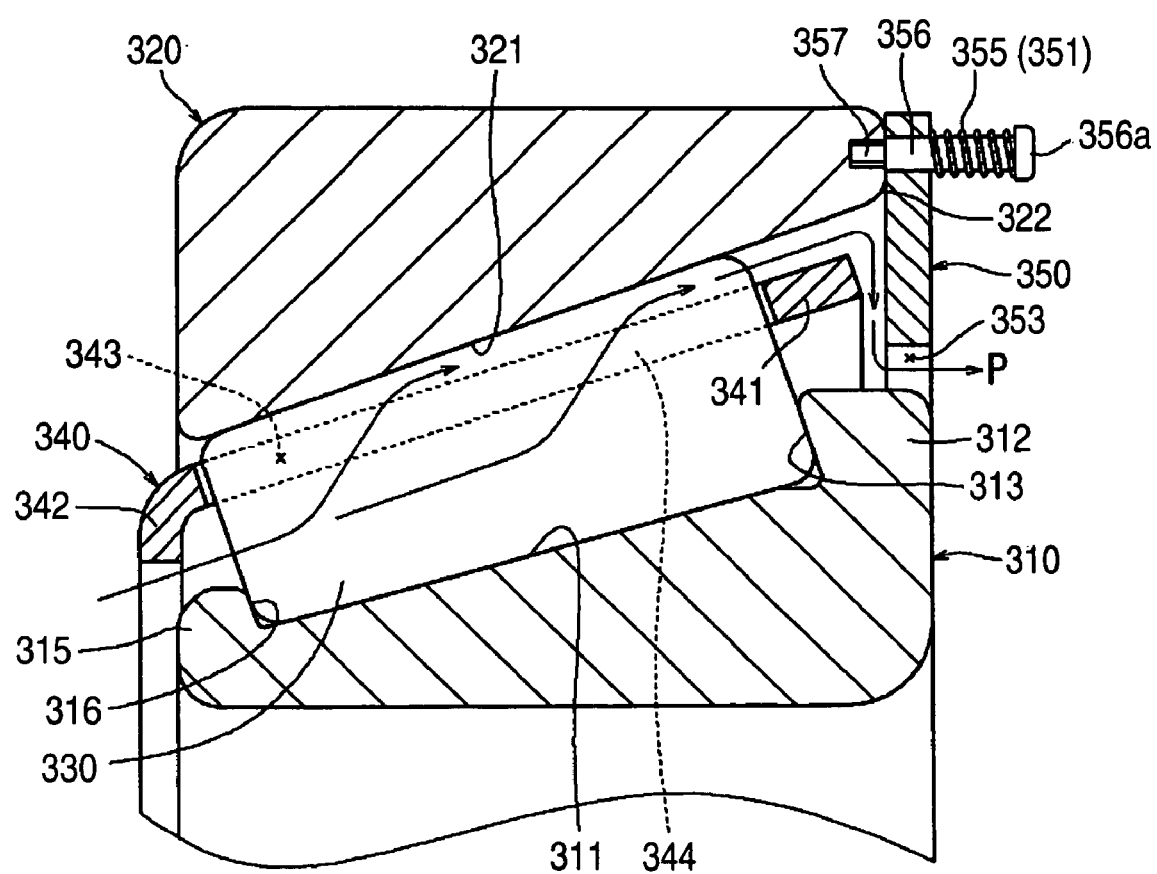
FIG. 17 is an explanatory view showing a flow of lubricating oil during the rotation of a fourth embodiment of a tapered roller bearing of the invention

FIG. 17 is an explanatory view showing a flow of lubricating oil during the rotation of a tapered roller bearing of the fourth embodiment. FIG. 18 is an explanatory view showing a condition in which an annular oil guide member is moved away from an end surface of an outer ring into an open condition by a fluid pressure of lubricating oil during the rotation of the bearing.

Figure 18:
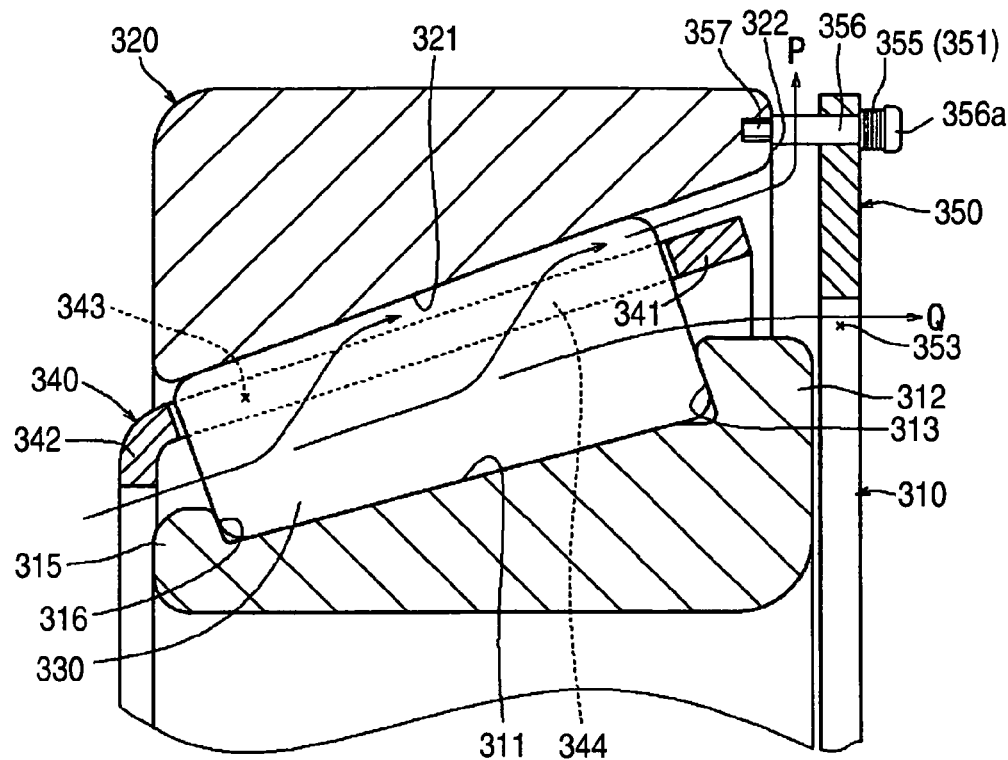
FIG. 18 is an explanatory view showing a condition in which an annular oil guide member is moved away from an end surface of an outer ring into an open condition by a fluid pressure of lubricating oil during the rotation of the bearing of the fourth embodiment.

As shown in FIGS. 17 and 18, in this fourth embodiment, compression coil springs 355 are used respectively as elastic members 351 for urging the annular oil guide member 350 into contact with the end surface 322 of the outer ring 320.

Namely, in this fourth embodiment, a plurality of threaded shafts 356 extend respectively through holes formed through the annular oil guide member 350 in a loosely fitted manner, and are threaded at their distal end portions (that is, externally-threaded portions) 357 into the end surface 322 of the outer ring 320. Thus, the annular oil guide member 350 is mounted on the end surface 322 of the outer ring 320 by the threaded shafts 356. Each compression spring 355 is mounted on the corresponding threaded shaft 356, and acts between a head 356a of the threaded shaft 356 and an outer surface of the annular oil guide member 350.

When the amount of lubricating oil passing through the tapered roller bearing is small, the annular oil guide member 350 is held in contact with the end surface 322 of the outer ring 320 and hence is held in a closed condition by an urging force of the compression coil springs 355 (see FIG. 17).

The urging force (compressive force) of the compression coil springs 355 is so set that when the amount of the lubricating oil passing through the bearing is large, the annular oil guide member 350 can be displaced away from the end surface 22 of the outer ring 320 into an open condition by a fluid pressure of the lubricating oil against the urging force (compressive force) of the compression coil springs 355 (see FIG. 18).

The other arrangement of this fourth embodiment is similar to that of the above third embodiment, and therefore those portions identical to those of the third embodiment are designated by identical reference numerals, respectively, and description thereof will be omitted.

Therefore, also in this fourth embodiment, advantageous effects generally similar to those of the third embodiment are achieved.

The present invention is not limited to the above third and fourth embodiments.

For example, for urging the annular oil guide member 350 into contact with the end surface 322 of the outer ring 320, the tension coil springs 352 are used as the elastic members 351 in the third embodiment, while the compression coil springs 355 are used as the elastic members 351 in the fourth embodiment. However, instead of such coil spring, any other suitable elastic member such as a leaf spring or an elastic member having rubber elasticity can be used.

Fifth Embodiment

Figure 19:
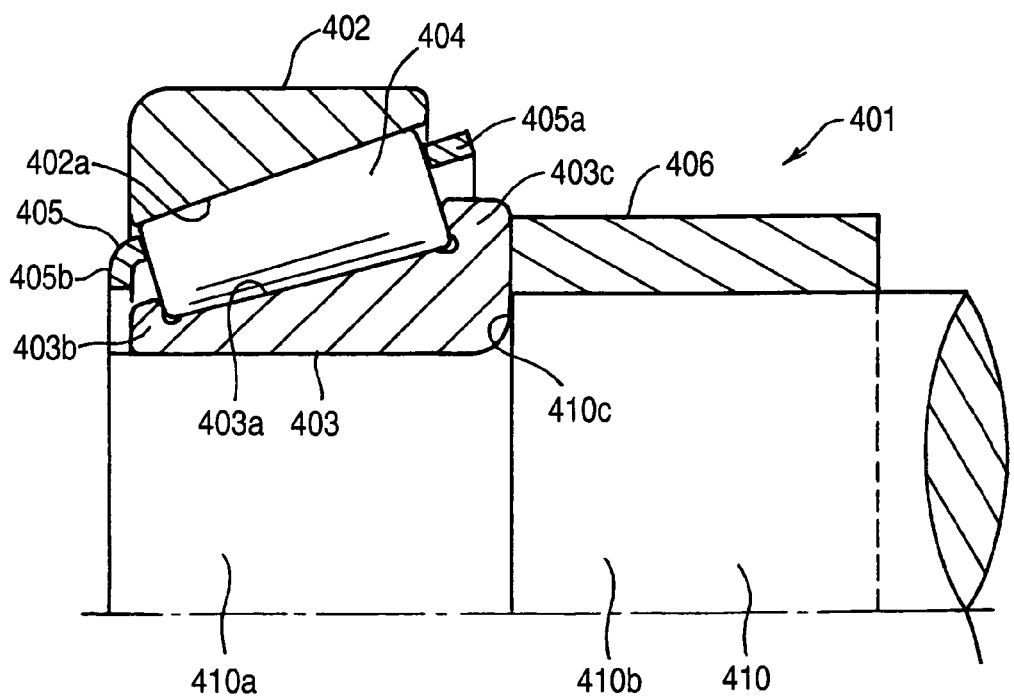
FIG. 19 is a longitudinal cross-sectional view showing an upper half of a fifth embodiment of a tapered roller bearing of the present invention.

FIG. 19 shows a fifth embodiment of a tapered roller bearing device of the present invention. This tapered roller bearing device 401 comprises an outer ring 402 to be mounted on a housing (not shown), an inner ring 403 mounted on a rotation shaft 410, a plurality of tapered rollers 404 disposed between the outer and inner rings 402 and 403, a cage 405 holding the tapered rollers 404, and a cylindrical heat radiation member 406 mounted on the rotation shaft 410 so as to release heat of the inner ring 403 to the rotation shaft 410.

The inner ring 403 has a tapered raceway surface 403a, and a small rib (small rib) 403b for limiting an axial movement of the tapered rollers 404 is formed at a left end portion of the raceway surface 403a, and a rib (large rib) 403c for limiting the axial movement of the tapered rollers 404 is formed at a right end portion of the raceway surface 403a.

The outer ring 402 has a tapered raceway surface 402a, and a right end surface of the outer ring 402 is disposed inwardly of a right end surface of the inner ring 403, and a left end surface of the outer ring 2 and a left end surface of the inner ring 403 are disposed in a common plane.

The cage 405 includes a larger-diameter end portion 405a projecting right beyond the tapered rollers 404, and a smaller-diameter end portion 405b projecting left beyond the tapered rollers 404. The smaller-diameter end portion 405b is bent radially inwardly such that its inner peripheral edge is generally opposed to the small rib 403b of the inner ring 403 in slightly spaced relation thereto.

The rotation shaft 410 includes a smaller-diameter portion 410a having the inner ring 403 fitted thereon, and a larger-diameter portion 410b extending right from the smaller-diameter portion 410a with a step portion 410c formed at the boundary therebetween. The right end surface of the inner ring 403 is received or supported by the step portion 410c.

Those portions of the tapered roller bearing other than the heat radiation member 406 and the rotation shaft 410 are already known, and the tapered roller bearing is made, for example, of bearing steel, and the rotation shaft 410 is made, for example, of carbon steel.

A left end surface of the heat radiation member 406 is held in contact with a rib-side end surface (back surface) of the inner ring 403, and an inner peripheral surface of the heat radiation member 406 is held in contact with an outer peripheral surface of the rotation shaft 410. The heat radiation member 406 is made of a material (such as aluminum alloy, magnesium alloy, etc.) higher in thermal conductivity than the rotation shaft 410.

In the tapered roller bearing device 1, because of frictional heat generated at an area of contact between a roller guide surface of the rib 403c of the inner ring 403 and end surfaces of the rollers 404, the temperature of the rib 403c becomes higher than the temperature of the rotation shaft 410, and the heat of the inner ring 403 is released to the rotation shaft 410 through the heat radiation member 406, thereby suppressing seizure.

Sixth Embodiment

Figure 20:
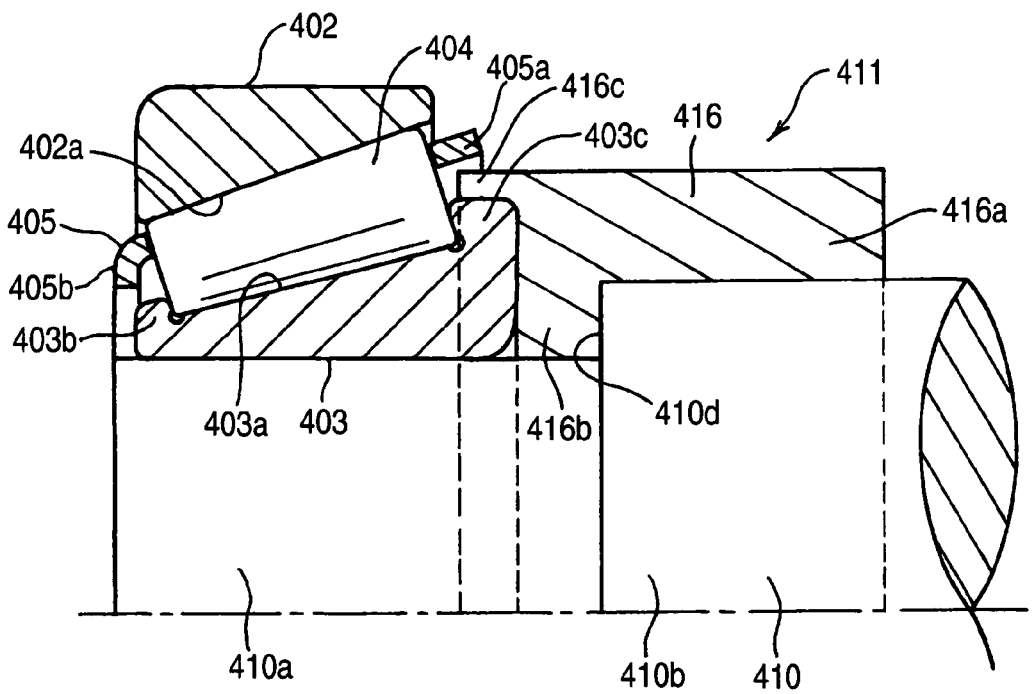
FIG. 20 is a longitudinal cross-sectional view showing an upper half of a sixth embodiment of a tapered roller bearing of the invention.

FIG. 20 shows a sixth embodiment of a tapered roller bearing device of the invention. In this tapered roller bearing device 411, a heat radiation member 416 differs in shape from the heat radiation member 406 of the fifth embodiment, and accordingly a rotation shaft 410 of the sixth embodiment also slightly differs in shape from that of the fifth embodiment. In the following description, those portions identical in arrangement to those of the fifth embodiment will be designated by identical reference numerals, respectively, and description thereof will be omitted.

In this embodiment, the heat radiation member 416 includes a cylindrical portion 416a, a flange portion 416b formed on and extending radially inwardly from an inner peripheral surface of the cylindrical portion 416a at a left end portion thereof, and an annular projecting portion 416c formed at the left end of the cylindrical portion 416a at an outer peripheral portion thereof. The heat radiation member 416 is made of a material (such as aluminum alloy, magnesium alloy, etc.) higher in thermal conductivity than the rotation shaft 410.

A step portion 410d of the rotation shaft 410 is shifted right as compared with the fifth embodiment so as to provide a space between an inner ring 403 and the step portion 410d into which space the inwardly-extending flange portion 416b of the heat radiation member 416 is snugly fitted. The left end surface of the cylindrical portion 16a of the heat radiation member 416 and a left surface of the inwardly-extending flange portion 416b are held in contact with a rib-side end surface (back surface) of the inner ring 403, and the inner peripheral surface of the cylindrical portion 416a of the heat radiation member 416 is held in contact with an outer peripheral surface of a larger-diameter portion 410b of the rotation shaft 410, and an inner peripheral surface of the inwardly-extending flange portion 416b is held in contact with an outer peripheral surface of a smaller-diameter portion 410a of the rotation shaft 410. Further, an inner peripheral surface of the annular projecting portion 16c of the heat radiation member 416 is held in contact with an outer peripheral surface of a rib 403c of the inner ring 403.

In the tapered roller bearing device 411 of this sixth embodiment, heat of the inner ring 403 is released to the rotation shaft 410 through the heat radiation member 416 as in the fifth embodiment, thereby suppressing seizure. The area of contact of the heat radiation member 416 with the inner ring 403 as well as the area of contact of the heat radiation member 416 with the rotation shaft 410 is larger as compared with the heat radiation member 406 of the fifth embodiment, and therefore a higher radiation effect can be obtained.

Furthermore, the heat radiation member 416 is located near to a sliding contact portion of the rib 403c forming a heat source, and therefore heat is radiated from the heat radiation member 416 without being stored in the inner ring 403.

Seventh Embodiment

Figure 21:
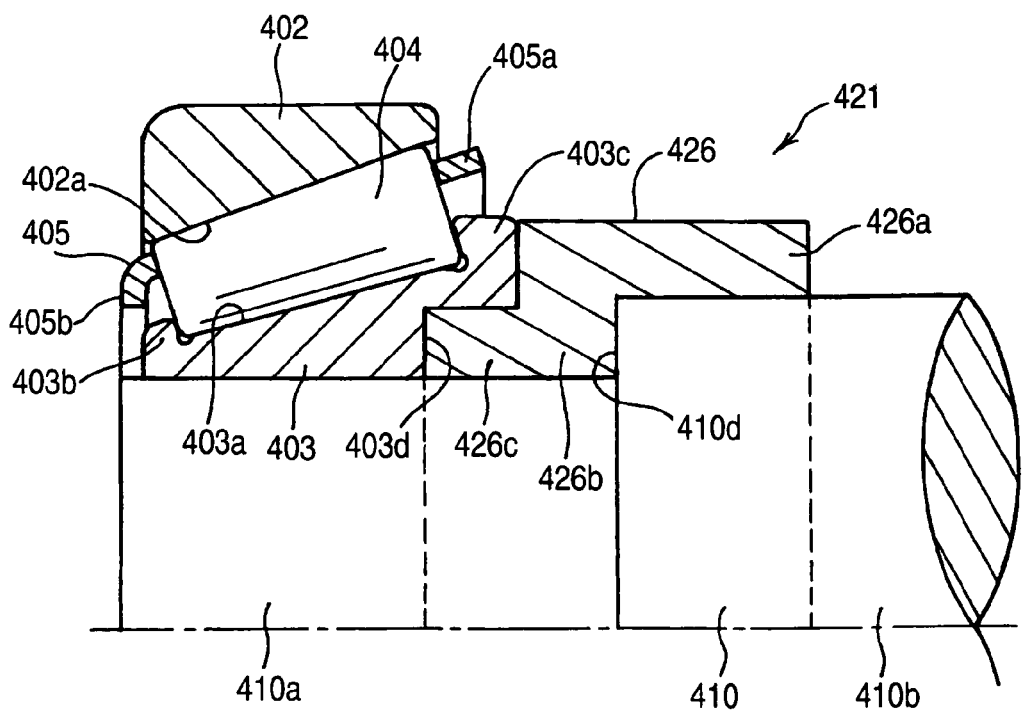
FIG. 21 is a longitudinal cross-sectional view showing an upper half of a seventh embodiment of a tapered roller bearing of the invention.

FIG. 21 shows a seventh embodiment of a tapered roller bearing device of the invention. In this tapered roller bearing device 421, a heat radiation member 426 differs in shape from the heat radiation member 406 of the fifth embodiment, and accordingly an inner ring 403 and a rotation shaft 410 of the seventh embodiment also slightly differ in shape from those of the fifth embodiment. In the following description, those portions identical in arrangement to those of the fifth embodiment will be designated by identical reference numerals, respectively, and description thereof will be omitted.

In this embodiment, the heat radiation member 426 includes a cylindrical portion 426a, a flange portion 426b formed on and extending radially inwardly from an inner peripheral surface of the cylindrical portion 426a at a left end portion thereof, and an annular projecting portion 426c formed at a left surface of the inwardly-extending flange portion 426b. The heat radiation member 426 is made of a material (such as aluminum alloy, magnesium alloy, etc.) higher in thermal conductivity than the rotation shaft 410.

As in the sixth embodiment, a step portion 410d of the rotation shaft 410 is shifted right as compared with the fifth embodiment so as to provide a space between the inner ring 403 and the step portion 410d into which space the inwardly-extending flange portion 426b of the heat radiation member 426 is snugly fitted. An annular notch portion 403d is formed in an inner peripheral surface of a rib portion 403c of the inner ring 403, and the annular projecting portion 426c of the heat radiation member 426 is snugly fitted in this annular notch portion 403d. A left end surface of the cylindrical portion 26a of the heat radiation member 426 is held in contact with a rib-side end surface (back surface) of the inner ring 403, and the inner peripheral surface of the cylindrical portion 426a of the heat radiation member 426 is held in contact with an outer peripheral surface of a larger-diameter portion 410b of the rotation shaft 410, and an inner peripheral surface of the inwardly-extending flange portion 426b is held in contact with an outer peripheral surface of a smaller-diameter portion 410a of the rotation shaft 410. Further, an outer peripheral surface and a left surface of the annular projecting portion 426c of the heat radiation member 426 are held in contact respectively with those surfaces of the inner rings 403 which define the notch portion 403d, and an inner peripheral surface of the annular projecting portion 426c is held in contact with the outer peripheral surface of the smaller-diameter portion 410a of the rotation shaft 410.

In the tapered roller bearing device 411 of this seventh embodiment, heat of the inner ring 43 is released to the rotation shaft 410 through the heat radiation member 426 as in the fifth embodiment, thereby suppressing seizure. The area of contact of the heat radiation member 426 with the inner ring 403 as well as the area of contact of the heat radiation member 426 with the rotation shaft 410 is larger as compared with the heat radiation member 406 of the fifth embodiment, and therefore a higher radiation effect can be obtained.

Figure 22:
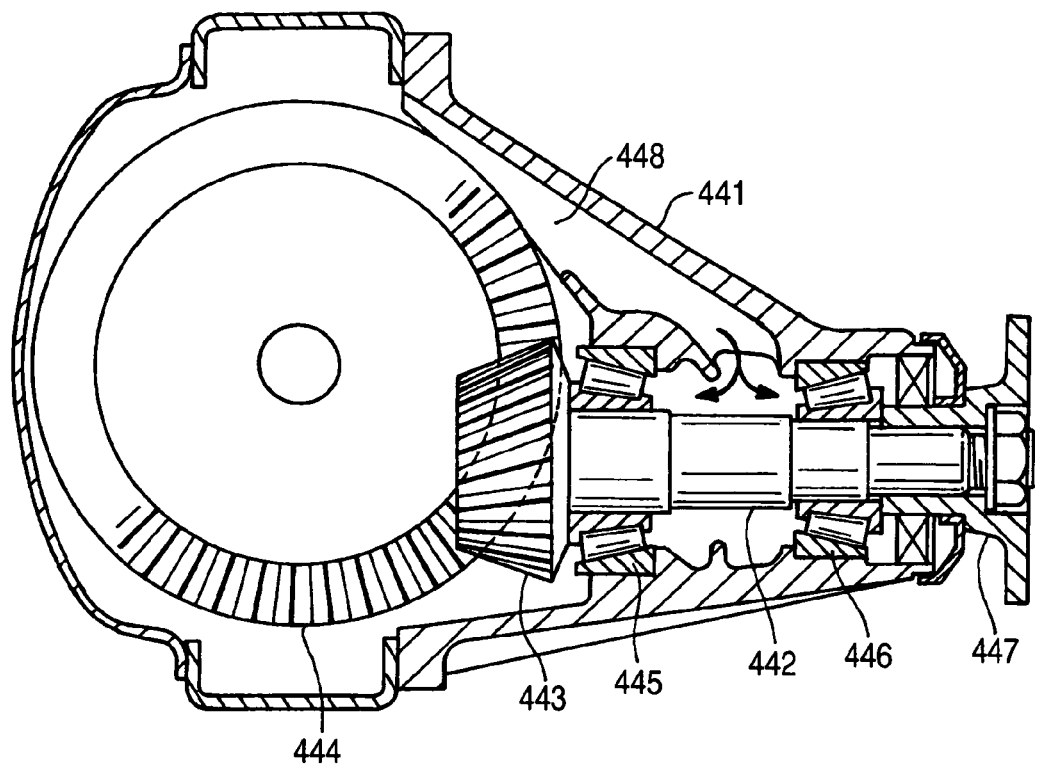
FIG. 22 is a longitudinal cross-sectional view of a differential gear in which the tapered roller bearing of the invention can be used.
Figure 23:
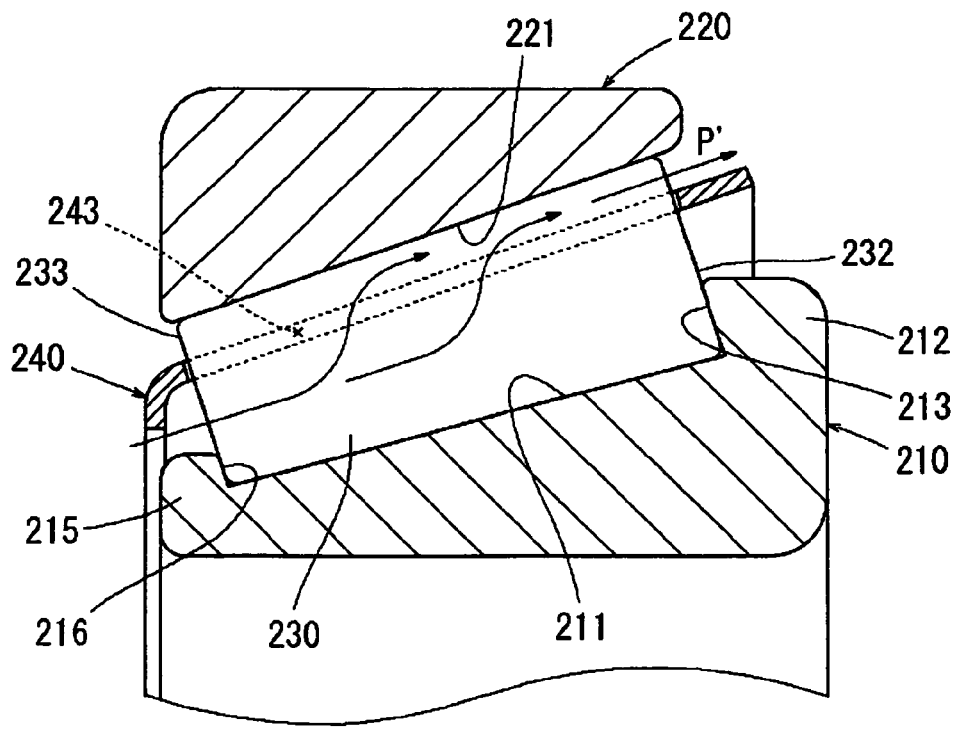
FIG. 23 is a longitudinal cross-sectional view showing a conventional tapered roller bearing.

The tapered roller bearing devices 401, 411 and 421 of the invention can be suitably used as the bearing devices for rotatably supporting the pinion shaft 442 on the housing 441 in the differential gear of the automobile shown in FIG. 22. The tapered roller bearings 401, 411, 421 are lubricated by lubricating oil received within the housing 441. In this case, in order to reduce a running torque, the amount of the lubricating oil passing through each tapered roller bearing is reduced, so that an oil agitation loss caused by the lubricating oil is suppressed. When the amount of the lubricating oil is reduced, the risk of seizure of the rib 403c of the inner ring 403 increases. However, heat of the rib 403c is released to the rotation shaft 410 (that is, to the pinion shaft 442 in FIG. 22) through the heat radiation member 406, 416, 426, and therefore even when the amount of the lubricating oil passing through the tapered roller bearing is much reduced, seizure of the rib 403c is less liable to occur, and both of the low-torque design and the seizure resistance can be achieved.

Incidentally, although the flange coupling 447 abuts against the inner ring of the right tapered roller bearing 446 (FIG. 22), thermal conductivity of this flange coupling 446 is lower than or generally equal to that of the pinion shaft 442, and the flange coupling 446 does not have such a radiation effect as achieved by the heat radiation member 406, 416, 426 made of the material (aluminum alloy, magnesium alloy, etc.) higher in thermal conductivity than the rotation shaft 410.

The structure provided with the heat radiation member of the present invention can be applied to an apparatus or a device using other bearing (such as a ball bearing, a cylindrical roller bearing, etc.) than the tapered roller bearing.

What is claimed is:

1. A tapered roller bearing comprising:
   an inner ring that includes a large rib defining a roller guide surface, a small rib and a raceway surface formed between the large and small ribs;
   an outer ring including a raceway surface;
   tapered rollers that are rollably disposed between the raceway surfaces of the inner and outer rings, large end surfaces of the tapered rollers being slidingly guided by the roller guide surface;
   a cage that includes pockets for holding the tapered rollers, respectively, and are disposed between the raceway surfaces of the inner and outer rings; and
   an oil guide member that is mounted on an outer peripheral surface of an end portion of the outer ring, and guides, toward an outer peripheral surface of the large rib, lubricating oil flowing from the small rib toward an inner peripheral surface of the outer ring through the pockets,
   wherein the oil guide member includes a tubular portion mounted on the outer peripheral surface of the end portion of the outer ring, and an annular portion that projects from an end of the tubular portion toward the outer peripheral surface of the large rib and comprises an elastic material so as to be elastically deformed,
   wherein an inner peripheral edge of the annular portion is spaced a predetermined distance from the outer peripheral surface of the large rib of the inner ring to form a discharge port for discharging the lubricating oil therebetween, and wherein the annular portion of the oil guide member is formed so as to be elastically deformable, by the flow of the lubricating oil, in a direction to expand the discharge port.

2. The tapered roller bearing according to claim 1, wherein the inner peripheral edge of the annular portion projects beyond a point of intersection of an extension of an outer peripheral surface of a large annular end portion of the cage and an inner side surface of the annular portion toward a center of the bearing.

3. The tapered roller bearing according to claim 1, wherein a fitting portion is formed at the outer peripheral surface of the end portion of the outer ring by reducing a diameter thereof by an amount corresponding to a thickness of the tubular portion, and wherein when the tubular portion is fitted on the fitting portion so that the tubular portion is abutted against a step surface at an inner end of the fitting portion, the outer peripheral surface of the outer ring and an outer peripheral surface of the tubular portion cooperate with each other to form a generally continuous cylindrical surface.

4. The tapered roller bearing according to claim 1, wherein the annular portion is disposed axially outward of the axially outer peripheral side of the tubular portion.

5. The tapered roller bearing according to claim 1, wherein the annular portion comprises an innermost radius smaller than an innermost radius of the tubular portion.

6. The tapered roller bearing according to claim 1, wherein, if the annular portion is deformed axially outward, then a size of the discharge port increases.

7. The tapered roller bearing according to claim 1, wherein at least a portion of the annular portion and at least a portion of the tubular portion comprise a same member.

8. The tapered roller bearing according to claim 1, wherein the oil guide member is formed so as to be elastically deformable such that a portion of the annular portion is elastically deformable to a position axially outward of an axially outer peripheral side of the tubular portion.

* * * * *